US012589603B2

(12) United States Patent
Inuzuka et al.

(10) Patent No.: US 12,589,603 B2
(45) Date of Patent: Mar. 31, 2026

(54) PRINTING APPARATUS

(71) Applicant: BROTHER KOGYO KABUSHIKI KAISHA, Nagoya (JP)

(72) Inventors: Kosuke Inuzuka, Nagoya (JP); Hiroaki Takahashi, Nagoya (JP); Yoshimitsu Taniguchi, Tajimi (JP); Yasuo Nishikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 27 days.

(21) Appl. No.: 18/465,670

(22) Filed: Sep. 12, 2023

(65) Prior Publication Data

US 2024/0092099 A1 Mar. 21, 2024

(30) Foreign Application Priority Data

Sep. 16, 2022 (JP) ................................ 2022-148186

(51) Int. Cl.
*B41J 11/66* (2006.01)
*B41J 11/70* (2006.01)
*B41J 29/12* (2006.01)

(52) U.S. Cl.
CPC .............. *B41J 11/663* (2013.01); *B41J 11/70* (2013.01); *B41J 29/12* (2013.01)

(58) Field of Classification Search
CPC ................................ B41J 11/70; B41J 11/663
See application file for complete search history.

(56) References Cited

U.S. PATENT DOCUMENTS

2020/0016901 A1* 1/2020 Chino .................. B41J 2/17566
2022/0184979 A1* 6/2022 Fukasawa ................ B41J 11/70

FOREIGN PATENT DOCUMENTS

JP 2006-137070 A 6/2006
WO WO-2022113899 A1 * 6/2022 ................ B41J 2/01

OTHER PUBLICATIONS

Tsuji, Machine Translation of WO-2022113899-A1, 2022 (Year: 2022).*

* cited by examiner

*Primary Examiner* — Scott A Richmond
(74) *Attorney, Agent, or Firm* — Kenealy Vaidya LLP

(57) ABSTRACT

A printing apparatus includes: a printing part having an installment part in which a cartridge usable for printing an image is installable, the printing part being configured to print the image on a print medium and configured to move to an exchange position in a scanning direction; and a processing unit having a processing part configured to move while making contact with the print medium, which has the image printed thereon by the printing part, to thereby perform a processing of the print medium, at least a part of the processing unit being positioned at a standby position which is shifted in the scanning direction with respect to the exchange position in a case that the cartridge is installed or detached with respect to the printing part.

16 Claims, 16 Drawing Sheets

PRINTING APPARATUS

REFERENCE TO RELATED APPLICATIONS

This application claims priority from Japanese Patent Application No. 2022-148186 filed on Sep. 16, 2022. The entire content of the priority application is incorporated herein by reference.

BACKGROUND ART

The present disclosure relates to a printing apparatus.

Conventionally, among the printing apparatuses each of which discharges or ejects a liquid from a liquid discharging head onto a sheet (paper, paper sheet) so as to perform printing on the sheet, there is a publicly known printing apparatus which is provided with a cutting part configured to cut a print medium such as the sheet. For example, there is a publicly known image recording apparatus provided with a cutting mechanism configured to cut roll paper, after discharging an ink from a recording head onto the roll paper to thereby perform printing on the roll paper.

An object of the present disclosure is to provide a printing apparatus which is configured to suppress occurrence of such a situation that an user makes contact with a processing unit of a print medium, or configured to suppress an occurrence of such a situation that the processing unit and a cartridge which stores an ink usable for recording make contact with each other, in a case that the cartridge is being exchanged.

DESCRIPTION

According to an aspect of the present disclosure, there is provided a printing apparatus including: a printing part and a processing unit. The printing part includes an installment part in which a cartridge usable for printing an image is installable. The printing part is configured to print the image on a print medium and configured to move to an exchange position in a scanning direction. The processing unit includes a processing part configured to move while making contact with the print medium, which has the image printed thereon by the printing part, to thereby perform a processing of the print medium. At least a part of the processing unit is positioned at a standby position which is shifted in the scanning direction with respect to the exchange position in a case that the cartridge is installed or detached with respect to the printing part.

The exchange position which is the position of the printing part in the case that the cartridge is being exchanged and the standby position of at least the part of the processing unit are shifted in the scanning direction. This suppresses occurrence of such a situation that the user makes contact with the processing unit or suppresses occurrence of such a situation that the cartridge and the processing unit make contact with each other, in the case that the cartridge is being exchanged.

According to the aspect of the present disclosure, it is possible to provide the printing apparatus preventing the user from making contact with a cutter unit of a print medium, or preventing the cutter unit and a cartridge which stores an ink usable for the recording from making contact with each other, in the case that the cartridge is being exchanged.

FIRST EMBODIMENT

In the following, a first embodiment of the present disclosure will be explained.

<Printing Apparatus 1>

<Schematic Configuration>

In the following, the schematic configuration of a printing apparatus 1 will be explained by using FIGS. 1 to 3.

Figure 1:
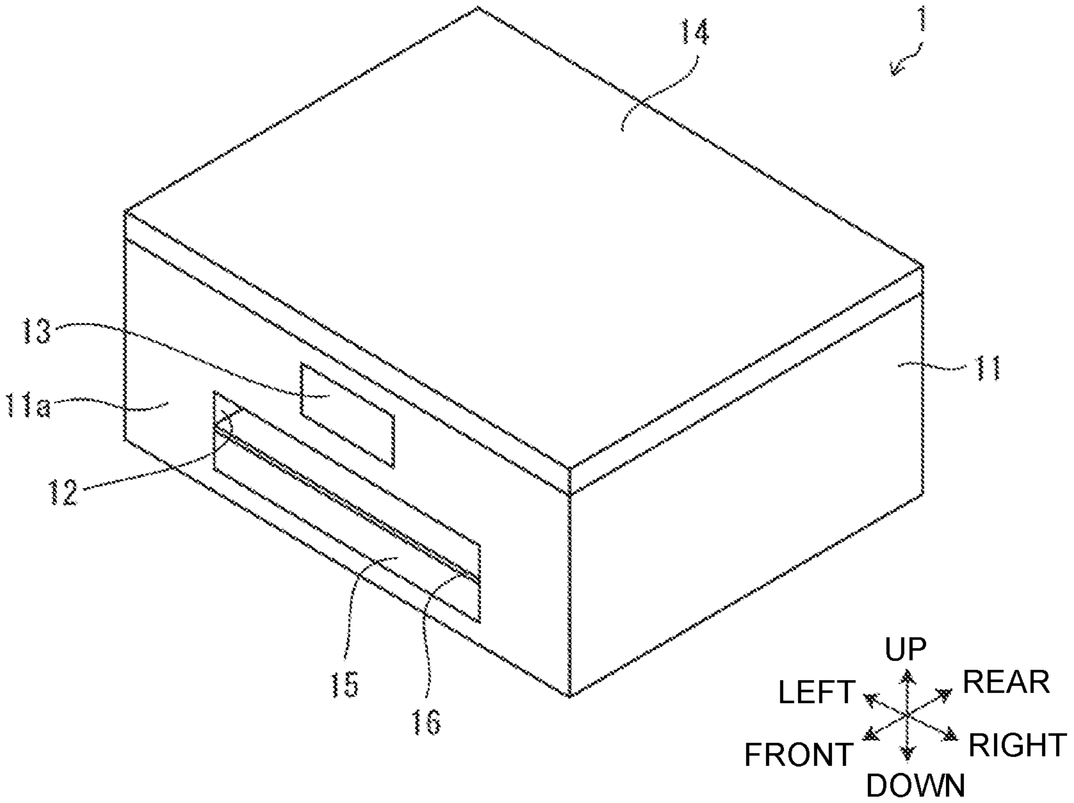
FIG. 1 is a schematic perspective view of a printing apparatus according to a first embodiment.

The printing apparatus 1 depicted in FIG. 1 is an example of an ink-jet printer. In the following explanation, the up-down direction is defined, with a state in which the printing apparatus 1 is installed usably, as depicted in FIG. 1, as the reference, with a surface on which the printing apparatus 1 is installed being defined as downward; the front-rear direction is defined, with a side on which an opening 12 is formed is defined as a front side; and the left-right direction is defined, with the printing apparatus 1 as seen from the front side.

Note that there is such a case that the front-rear direction is referred to as a conveyance direction of a sheet P, which is an example of a print medium, by a conveyor 5 (see FIG. 2, to be described later on). Further, there is such a case that an upstream side in the conveyance direction is referred to as the "rear side", and a downstream side in the conveyance direction is referred to as the "front side". Furthermore, there is such a case that the left-right direction is referred to as a scanning direction which is a moving direction of a carriage 40 (see FIG. 2, to be described later on). Moreover, there is such a case that the up-down direction is referred to as a direction orthogonal to a nozzle surface 421 of a recording head 41 (see FIG. 2). Further, there is such a case that the up-down direction is referred to as a direction crossing the above-described conveyance direction and scanning direction.

As depicted in FIG. 1, the printing apparatus 1 forms, as a whole, a substantially rectangular parallelepiped shape with a casing 11. The opening 12 is formed (defined) in a front wall 11*a* of the casing 11. A feed tray 15 and a discharge tray 16 are detachably installed, via the opening 12, with respect to the printing apparatus 1. Further, an operation panel 13 is provided on the front wall 11*a* of the casing 11. The operation panel 13 has a variety of kinds of operation buttons and a liquid crystal displaying part. An instruction input which is inputted via the operation panel 13 is outputted to a controller 100 (see FIG. 2).

The casing 11 is a casing which includes a printing part 4 and a cutter unit 60 (see FIG. 2, to be descried later on) and which is configured to accommodate or store a member to be used for printing an image. The casing 11 has a cover 14 which constructs a ceiling part of the casing 11, as depicted in FIGS. 1 and 2. The cover 14 is rotatably supported, at a rear end part thereof, by a rotation shaft (not depicted in the drawings) which is along the left-right direction. By opening the cover 14, an opening 11*b* (see FIG. 3) of the upper surface of the casing 11 is exposed, which in turn makes it possible to access the inside of the printing apparatus 1. With this, a cartridge 142 (see FIG. 3, to be described later on) is exposed, which in turn makes int possible to insert or remove the cartridge 142 with respect to the casing 11.

Note that the printing apparatus 1 may have a scanner casing (not depicted in the drawings) between the casing 11 and the cover 14. A scanner configured to read an image recorded on a sheet may be installed in the inside of the scanner casing.

<Internal Configuration>

Next, the internal configuration of the printing apparatus 1 will be explained by using FIG. 2. As depicted in FIG. 2, the printing apparatus 1 is provided with a feeding part 3, the printing part 4, the conveyor 5, the cutter unit 60 and the controller unit 100.

The feeding part 3 has a shaft 30, a feeding arm 31 and a feeding roller 32. The feeding part 3 feeds, to a conveyance route R, a sheet P accommodated in the feed tray 15 by a normal rotation of the feeding roller 32. The feeding roller 32 is rotatably supported by a forward end part of the feeding arm 31. The feeding arm 31 is pivotably supported by the shaft 30 which is supported by a frame of the ink-jet printer 1. The feeding arm 31 is pivotably urged toward the feed tray 15 by the self-weight or an elastic force by a spring, etc.

Figure 9:
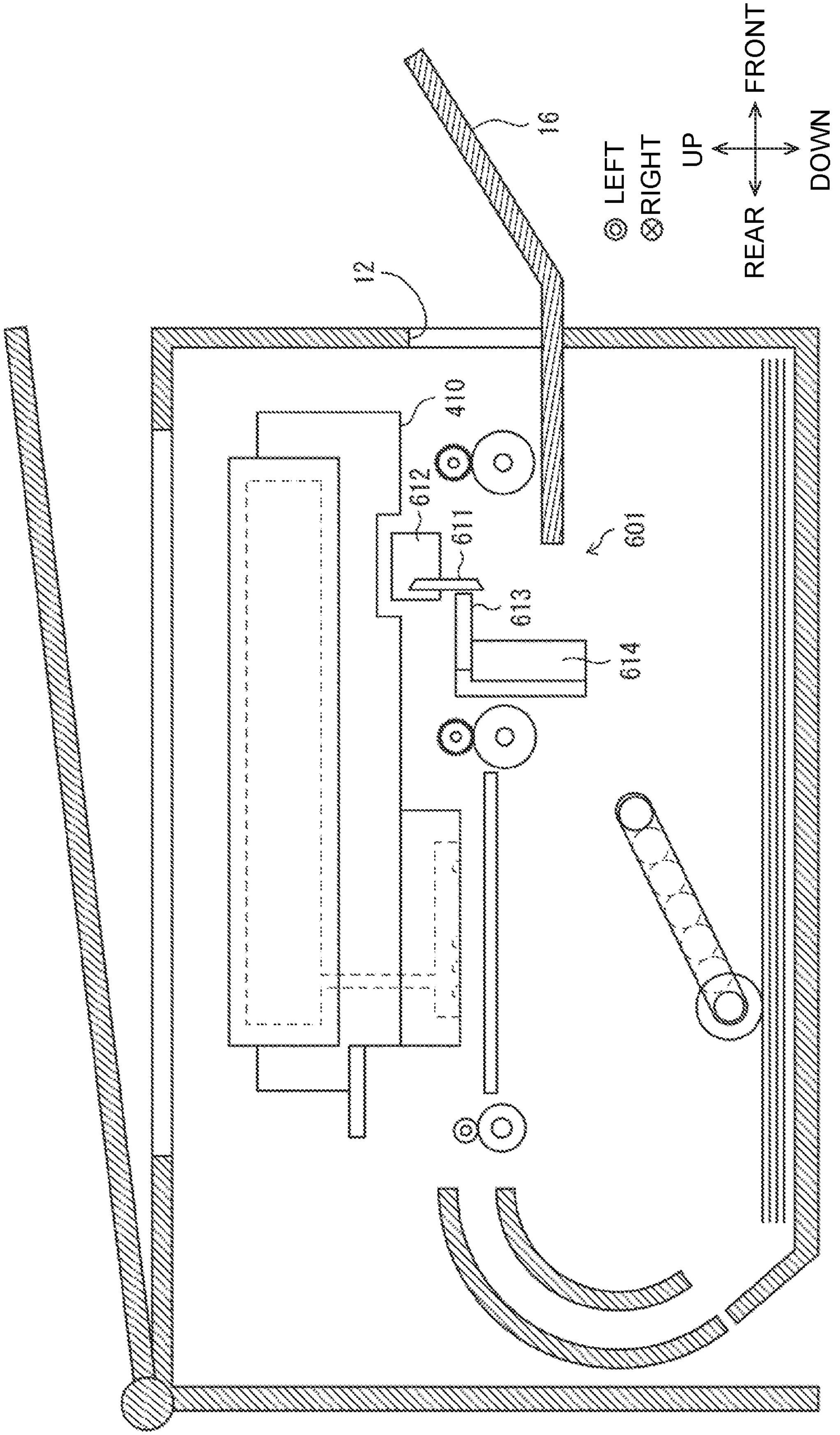
FIG. 9 is a schematic view depicting an example of a positional relationship between a carriage and the cutter unit in the printing apparatus according to the first embodiment.

The conveyance route R extends upward from a rear end part of the feed tray 15, is curved in an area thereof which is defined by a guide member 33 and reaches the discharge tray 16 via a position of the printing part 4 and a position of the cutter unit 60. Note that the discharge tray 16 is configured to be capable of being drawn or pulled from the opening 12 to the outside of the casing 11. Further, the discharge tray 16 is configured to be foldable or slidably accommodatable in the inside of the casing 11. Specifically, as depicted in FIG. 9, the discharge tray 16 may be in a state that the discharge tray 16 is drawn, via the opening 12, to the outside of the casing 11, a state that a part, of the discharge tray 16, which is folded in the inside of the casing 11 is expanded, or a state that a part, of the discharge tray 16, which is slidably accommodated in the inside of the casing 11 is slid and extended to the outside of the casing 11.

In a case that a feeding motor (not depicted in the drawings) is driven by the controller unit 100, the feeding roller 32 is thereby caused to take out, one by one, sheets P from the feed tray 21. Each of the sheets P taken out from the feed tray 21 is fed along the conveyance route R, and is supplied to the recording part 4.

The recording part 4 is arranged at a location above the feeding part 3. The recording part 4 is constructed of a carriage 40. A recording head 41, which is an example of a liquid discharging head, is installed in the carriage 40. The recording head 41 has a plurality of nozzles 42. A platen 43 is positioned at a location below the carriage 40. The carriage 40 is supported by a guide rail 9A and a guide rail 9B which extend in the left-right direction (see FIG. 3).

In a case that a driving force of a carriage motor (not depicted in the drawings) is transmitted to the carriage 40, the carriage 40 is reciprocally moved in the scanning direction, which is a moving direction rightward and leftward, namely, a width direction of the sheet P which is being conveyed. In a recording of an image on the sheet P, the controller unit 100 of the printing apparatus 1 repeats a recording processing of ejecting or discharging an ink from the plurality of nozzles 42 of the recording head 41 while moving the carriage 40 in the width direction of the sheet P in a state that the sheet P is stopped to thereby record an image corresponding to one line on the sheet P, and a conveying processing of driving the conveying roller 51 and the conveying roller 52 to thereby convey the sheet P by a predetermined line feed amount.

The plurality of nozzles 42 are provided on a lower surface of the recording head 41 installed in the carriage 40. The plurality of nozzles 42 are aligned in the front-rear direction to thereby form a nozzle row (nozzle array); four pieces of the nozzle row arranged side by side in the left-right direction are formed in the nozzle surface 421. Black, yellow, cyan, and magenta inks are discharged from the plurality of nozzles 42, in an order from nozzles 42, of the plurality of nozzles 42 forming a nozzle row which is included in the four nozzle rows and which is located on the right (rightmost) side in the left-right direction. Note that the order of arranging the nozzle rows is not limited to this; it is allowable to change the order of arrangement with respect to each product or model (of the ink-jet printer 1). Note that although the printing apparatus 1 is an apparatus capable of performing a color printing, the printing apparatus 1 may be an apparatus dedicated to a monochromatic printing.

Further, the carriage 40 has an installment part 140 in which the cartridge 142 is installed. The cartridge 142 is detachably (removably) installed with respect to the installment part 140. The printing apparatus 1 is a printing apparatus of a so-called on-carriage type in which the recording head 41 and the cartridge 142 are installed in the carriage 40.

The installment part 140 may be configured so that the entirety of the cartridge 142, which is installed in the installment part 140, is positioned above the recording head 41. Alternatively, the installment part 140 may be configured so that a part of the cartridge 142, which is installed in the installment part 140, is positioned above the recording head 41 and that a remaining part, of the cartridge 142, is positioned below the recording head 41.

The recording head 41 is configured to discharge or eject the ink accommodated or stored in the cartridge 142 from the plurality of nozzles 42. The recording head 41 vibrates a vibration element such as a piezoelectric elements to thereby discharge a droplet of the ink (ink droplet) from each of the plurality of nozzles 42.

Here, the cartridge 142 will be explained by using FIG. 3. As depicted in FIG. 3, four pieces of the cartridge 142 which are arranged side by side in the left-right direction are installed in the installment part 140. Each of the four cartridges 142 is detachably installed in the installment part 140. Each of the cartridges 142 is an example of a liquid tank configured to store a liquid which is to be supplied to the recording head 41. The four cartridges 142 store, respectively, the black, yellow, cyan and magenta inks. The ink stored in each of the cartridges 142 is supplied to the recording head 41 via a tube (not depicted in the drawings). Note that each of the cartridges 142 may be a cartridge in which a cartridge body which has a liquid storing part, and the recording head 41 are formed as an integrated body or may be a cartridge in which the recording head 41 is a separate body from the cartridge body and is separable from the cartridge body.

The platen 43 is located below the ink-jet head 41, and extends over an entire length in the left-right direction of the sheet P. During a recording processing, the platens 43 supports the P from therebelow. The recording head 41 discharges the ink droplets selectively therefrom in a process in which the carriage 40 moves with respect to the sheet P supported by the platen 43, thereby recording an image on the sheet P.

The conveyor 5 has a conveying roller 51, and a conveying roller 52 and a discharging roller 54 which are arranged, respectively, on the rear side and the front side so as to sandwich the carriage 40 and the platen 43 therebetween in the front-rear direction. A pinch roller 50 is provided on a location above the conveying roller 51 at a position facing the conveying roller 51. The conveying roller 51 is driven by a conveying motor (not depicted in the drawings). The pinch roller 50 rotates accompanying with rotation of the conveying roller 51. By the conveying roller 51 and the pinch roller 50 rotating normally, the sheet P is thereby nipped by the conveying roller 51 and the pinch roller 50 and is conveyed along the conveyance route R toward the recording part 4.

The conveying roller 52 is provided to be positioned on the downstream side with respect to the conveying roller 51, with the carriage 40 and the platen 43 being sandwiched between the conveying roller 52 and the conveying roller 51 in the front-rear direction. A spur roller 53 is provided on a location above the conveying roller 52 at a position facing the conveying roller 52. The conveying roller 52 is driven by the conveying motor (not depicted in the drawings). The spur roller 53 rotates accompanying with rotation of the conveying roller 52. By the conveying roller 52 and the spur roller 53 rotating normally, the sheet P is thereby nipped by the conveying roller 52 and the spur roller 53 and is conveyed to the cutter unit 60 along the conveyance route R.

The discharging roller 54 is provided to be positioned on the downstream side with respect to the cutter unit 60. A spur roller 55 is provided on a location above the discharging roller 54 at a position facing the discharging roller 54. The discharging roller 54 is driven by the conveying motor (not depicted in the drawings). The spur roller 55 rotates accompanying with rotation of the discharging roller 54. By the discharging roller 54 and the spur roller 55 rotating normally, the sheet P is thereby nipped by the discharging roller 54 and the spur roller 55 and is discharged to the discharge tray 16.

Figure 2:
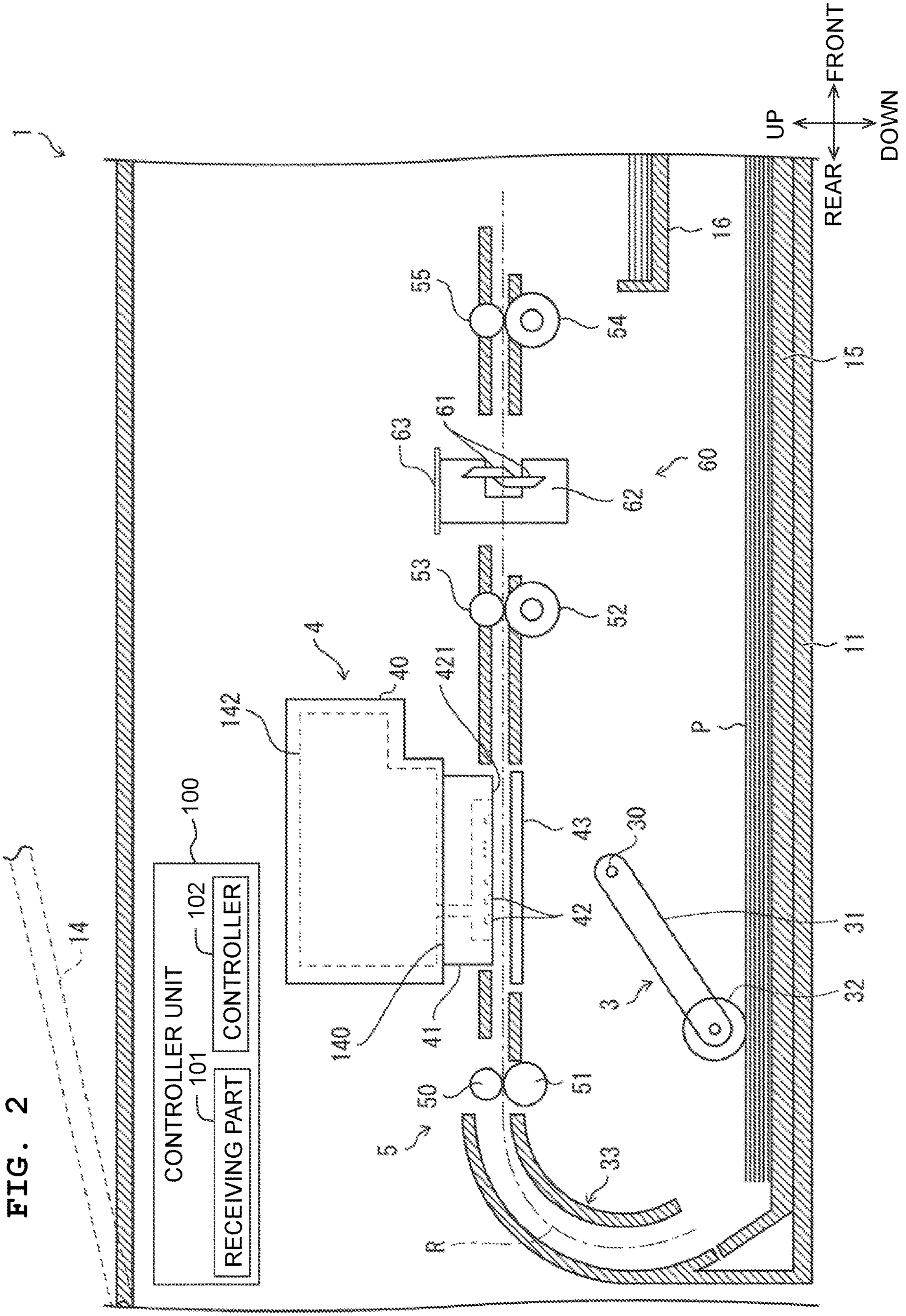
FIG. 2 is a cross-sectional view schematically depicting the internal configuration of the printing apparatus according to the first embodiment, in a side view.
Figure 3:
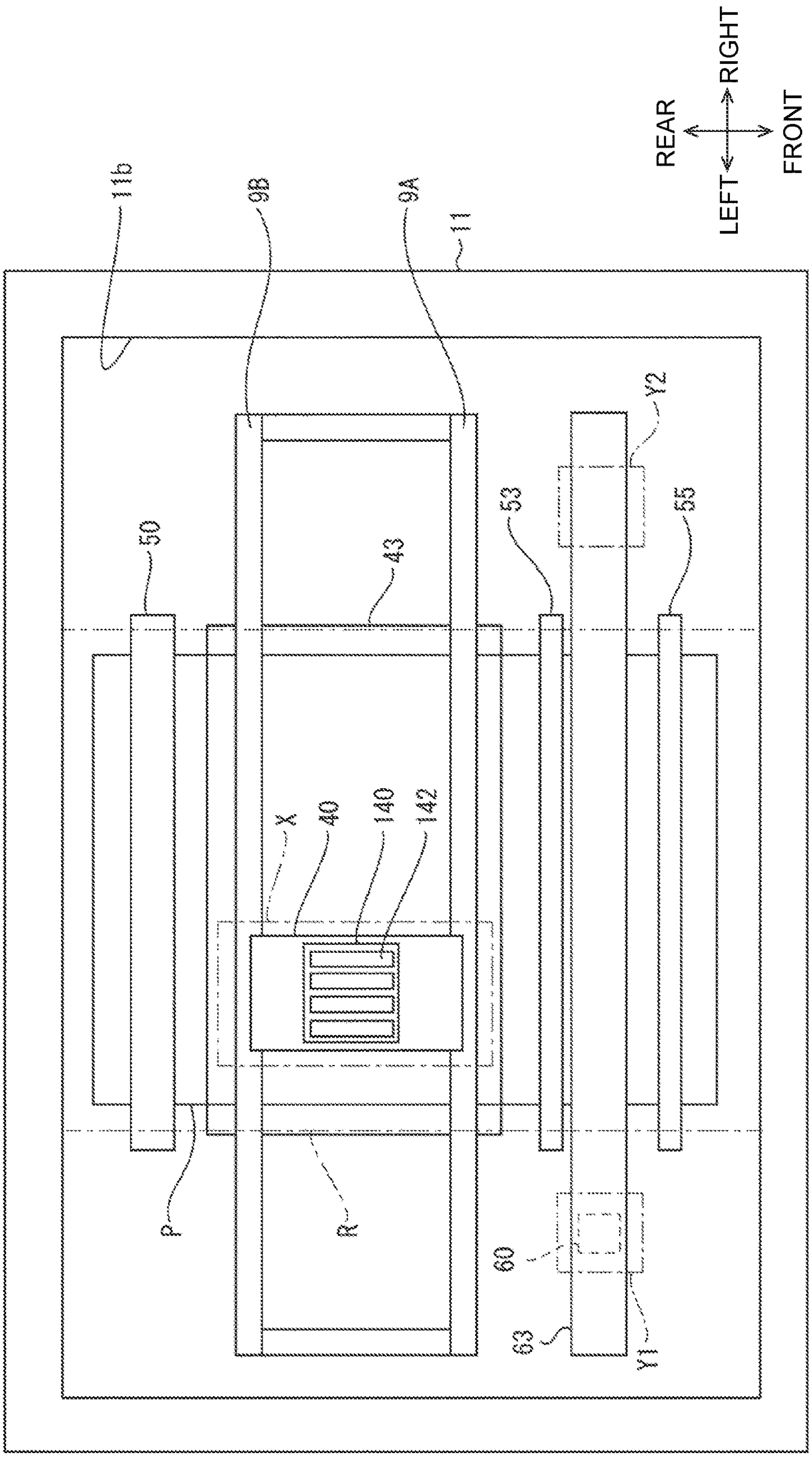
FIG. 3 is a cross-sectional view of the printing apparatus of the first embodiment, as seen from thereabove.

As depicted in FIG. 2, the cutter unit 60 has a processing part having a pair of upper and lower blades 61 supported by a cutter carriage 62. The cutter unit 60 is an example of a processing unit having a processing part configured to move while causing the blade 61, as a processing member, to make contact with the sheet P to thereby perform a processing of the sheet P. The cutter unit 60 is configured to cut the sheet P while dividing the sheet P completely into two sheets. Note that the present disclosure is not limited to or restricted by this example. For example, it is allowable that the printing apparatus 1 is provided with a processing unit configured to execute a creasing processing of imparting a creasing with respect to the sheet P or that the printing apparatus 1 is provided with a processing unit configured to execute a perforating processing of imparting a perforation with respect to the sheet P, instead of the cutter unit 6. In such a case that the ink-jet printer 1 is provided with these processing units, the processing unit is provided with a processing part configured to impart the creasing to the sheet P, or a processing part configured to impart the perforation to the sheet P.

The cutter unit 60 is provided between the conveying roller 52 and the discharging roller 54. The cutter unit 60 is provided on the downstream side in the conveyance direction with respect to the printing part 4. The cutter unit 60 cuts a sheet P having the image printed thereon by the printing part 4 and conveyed by the conveyor 5. In a case that a driving force of a cutter carriage motor (which is not depicted in the drawings) is transmitted to the cutter carriage 62, the cutter unit 60 causes the blade 61 to move in the left-right direction and cuts the sheet P in the width direction.

In the printing apparatus 1, the pair of upper and lower blades 61 are each a circular shaped round blade. The blades 61 which are the pair of upper and lower round blades are supported by the cutter carriage 62 which is movable in the left-right direction. The cutter carriage 62 is supported by a rail 63 extending in the left-right direction and moves along the rail 63 to thereby move the blades 61 in the left-right direction (see FIG. 3). The rail 63 is configured to scan the blades 61 each of which is the movable part.

Note that the pair of upper and lower blades 61 may be configured such that a first blade as one of the blades 61 is a fixed blade and that a second blade as the other of the blades 61 is a round blade. In this case, the fixed blade extends in the left-right direction and is fixed to the casing 11. Further, the round blade is supported by a carriage movable in the left-right direction. Furthermore, the pair of upper and lower blades 61 may be fixed blades which are provided, respectively, on the upper side and the lower side with respect to the conveyance route R and which extend in the left-right direction. In such a case, by moving these fixed blades so that the fixed blade on the upper side and the fixed blade on the lower side approach closely toward each other, thereby cutting the sheet P in the width direction.

The controller unit 100 is provided with: a CPU (Central Processing Unit), a ROM (Read Only Memory), a RAM (Random Access Memory), an ASIC (Application Specific Integrated Circuit) including various kinds of control circuits, etc. Note that in the present embodiment, although the explanation will be given on the premise that the controller unit 100 is provided with the CPU, the ROM, the RAM and the ASIC, the present disclosure is not limited to or restricted by such a configuration. It is allowable that the controller unit 100 is realized by any hardware configuration. The controller unit 100 is connected to various devices or units constructing the printing apparatus 1, such as, for example, the printing part 4, the conveying motor of the conveyor 5, etc. Further, the controller unit 100 is also connected to the operation panel 13 and to a PC, a smartphone, etc., each of which is an external device, so that the controller unit 100 is capable of performing communication with respect to the operation panel 13 and the external devices such as the PC, the smartphone, etc.

As depicted in FIG. 2, the controller unit 100 is provided with a receiving part 101 and a controller 102. The receiving part 101 receives an instruction input by a user. The receiving part 101 receives the instruction input which is inputted by the user via the operation panel 13. Further, it is allowable that the receiving part 101 receives an instruction input from the external device such as the PC, the smartphone, etc.

The controller 102 executes, by the CPU and the ASIC, various types of processings such as a printing operation of printing an image by the recording head 41, a discharging operation of the ink droplets from the plurality of nozzles 42 referred to as a flushing, etc., in accordance with programs stored in the ROM. In a case that the instruction input by the user is received in the receiving part 101, the controller 102 executes a processing in accordance with the instruction input. As an example, the controller 102 controls the recording head 41, the conveying motor, etc., based on a print instruction transmitted from the external apparatus such as the PC, the smartphone, etc., to thereby executes a printing processing of printing an image on a sheet P.

In the above-described configuration, the printing apparatus 1 prints, by the printing part 4, an image on the sheet P by discharging the ink while moving the recording head 4 together with the carriage 40 in the scanning direction, while conveying the sheet P in the conveyance direction by the conveyor 5.

<Exchange of Cartridge 142>

Figure 4:
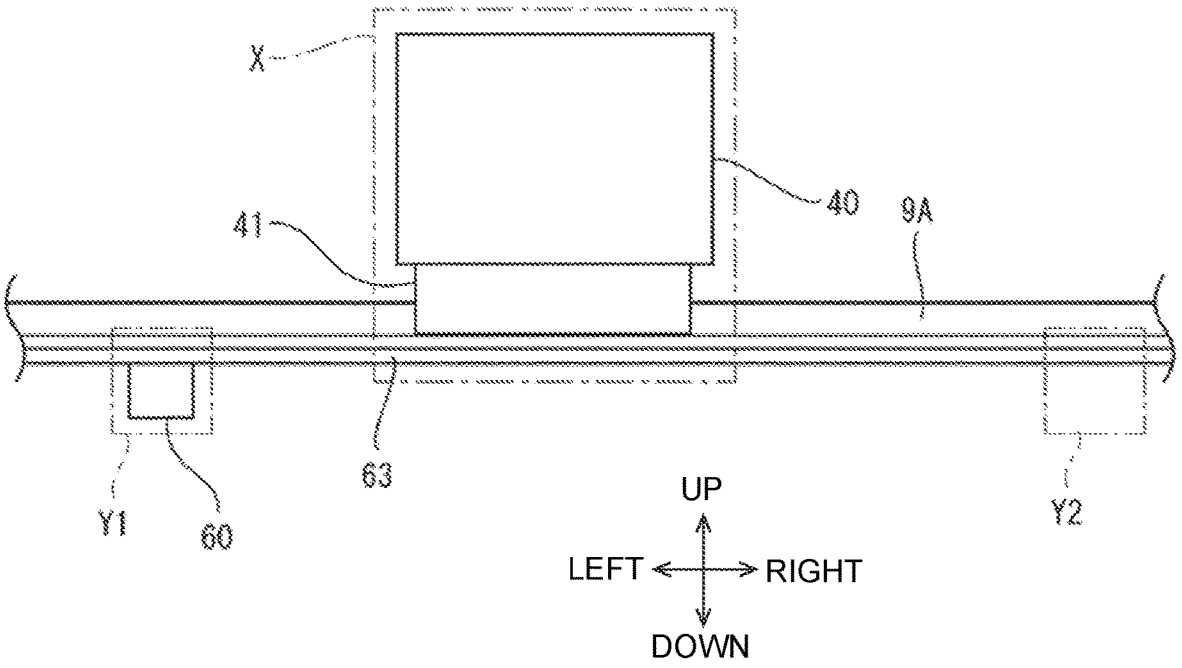
FIG. 4 is a schematic view depicting a positional relationship between an exchange position of a cartridge and a standby position of a cutter unit in the printing apparatus according to the first embodiment.

The printing apparatus 1 installs the cartridges 142 in the installment part 140 in the carriage 40 to thereby supply, to the recording head 41, the inks stored in the inside of the cartridges 142 and to be used for recording the image. Each of the cartridges 142 installed in the installment part 140 can be detached (removed) from the installment part 140 and can be exchanged, in a case, for example, that the ink stored therein becomes to be short or empty. The exchange of the cartridge 142 will be explained by using FIG. 3 and FIG. 4. FIG. 4 is a schematic view depicting a positional relationship between an exchange position of the cartridge 142 and a standby position of the cutter unit 60.

Each of the cartridges 142 can be installed or detached with respect to the installment part 140 in a case that the carriage 40 is located at a predetermined exchange position X in the left-right direction. The carriage 40 is movable to the predetermined exchange position X in the left-right direction. Further, in a case that the cartridge 142 is installed or detached with respect to the carriage 40, at least a part of the cutter unit 60 is located at a standby position Y1 or a standby position Y2 shifted in the scanning direction with respect to the exchange position X.

The exchange position X overlaps with the opening 11*b* of the casing 11 as seen from the upper side in the up-down direction. Accordingly, the cartridge 142 detached from the carriage 40 moved to the exchange position X is taken out to the outside of the casing 11 via the opening 11*b* of the casing 11. Further, after the cartridge 142 is taken out, another cartridge 142 to be exchanged therefor is inserted into the inside of the casing 11 via the opening 11*b*, and is installed in the installment part 140 of the carriage 40 located at the exchange position X.

The exchange position X is shifted in the scanning direction with respect to the standby position Y1 or Y2 and is configured to not to overlap with the standby position Y1 or Y2, as seen from the front-rear direction and the up-down direction. Note that the standby position Y1 or Y2 may be located at the outside of an area passing the conveyance route R in the scanning direction. In such a case, the exchange position X may be in the inside of the area passing through the conveyance route R, or may be a position which is shifted in the scanning direction with respect to the standby position Y1 or Y2, at the outside the area passing through the conveyance route R.

The cartridge 142 may be configured such that, in a case that the carriage 40 is located at a position different from the exchange position X, the cartridge 142 is locked so that the cartridge 142 cannot be detached from the installment part 140. Further, the cartridge 142 may be configured such that, in a case that the carriage 40 is moved to the exchange position X, the cartridge 142 is released from the locking and the cartridge 142 can be detached.

Furthermore, the carriage 40 may be configured such that the carriage 40 is moved to the exchange position X based on a predetermined instruction input by the user. Specifically, in a case that the predetermined instruction input is received by the receiving part 101, the controller 102 causes the carriage 40 to move to the exchange position X.

Moreover, the controller 102 may cause at least the part of the cutter unit 60 to move to the standby position Y1 or Y2 in a case that a predetermined instruction input is received by the receiving part 101. Further, the controller 102 may cause the carriage 40 to move to the exchange position X and may cause at least the part of the cutter unit 60 to move to the standby position Y1 or Y2 in the case that the predetermined instruction input is received by the receiving part 101. Furthermore, the controller 102 may cause at least the part of the cutter unit 60 to move to the standby position Y1 or Y2 and then the controller 102 may cause the carriage 40 to move to the exchange position X in the case that the predetermined instruction input is received by the receiving part 101. Moreover, the cutter unit 60 may be located at the standby position Y1 or Y2, except for a case that the cutter unit 6 executes the processing with respect to the sheet P.

The predetermined instruction input received by the receiving part 101 is, for example, an input indicating an exchanging instruction of the cartridge 142, an input indicating a moving instruction of the carriage 40, an input indicating a moving instruction of the cutter unit 60, etc.

Figure 5:
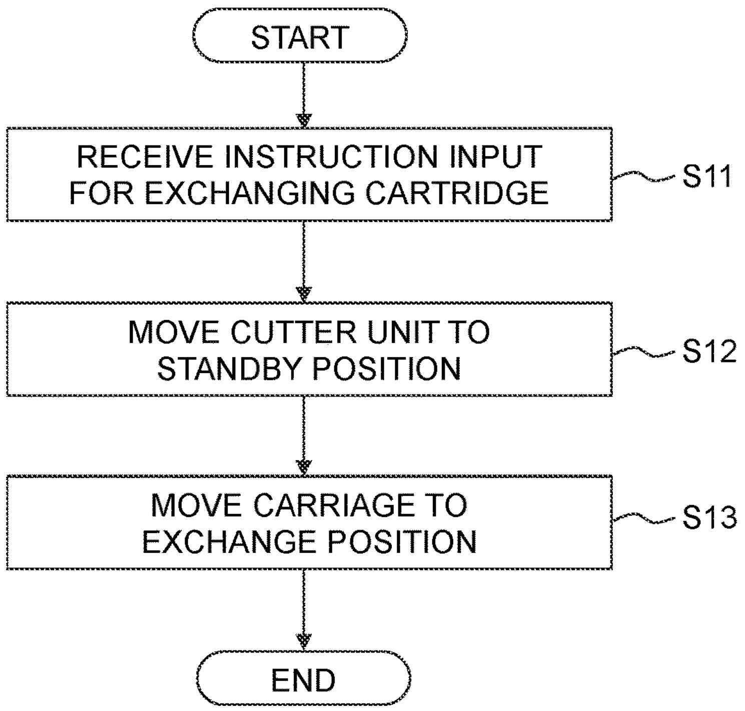
FIG. 5 is a flow chart indicating an example of a processing by a controller in the printing apparatus according to the first embodiment.

Here, an example of a flow of a processing by the controller unit 100 will be explained, by using FIG. 5. FIG. 5 is a flow chart indicating the example of the processing by the controller unit 100 in the printing apparatus 1 according to the first embodiment. As depicted in FIG. 5, at first, the receiving part 101 receives the instruction input indicating the exchange instruction of the cartridge 142 (step S11). Next, the controller 102 causes the cutter unit 60 to move to the standby position Y1 or Y2 (step S12). Then, the controller 102 causes the carriage 40 to move to the exchange position X (step S13) and ends the processing. Note that the processing by the controller unit 100 depicted in FIG. 5 may be executed before starting the printing processing or may be executed at a timing at which an ink remaining amount of the ink cartridges 142 becomes small during the execution of the printing processing. A notification that the ink remaining amount is small is notified to the user, for example, by the controller unit 100 causing the liquid crystal displaying part, etc., to display that the ink remaining amount is small.

The Action and Effect of the Present Embodiment

According to the above-described configuration, the exchange position X which is the position of the carriage 40 in a case that the cartridge 142 is being exchanged and the standby position Y1 or Y2 of at least the part of the cutter unit 60 are shifted in the scanning direction. With this, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

Further, according to the above-described configuration, the controller 102 causes the carriage 40 to move to the exchange position, based on the instruction input of exchanging the cartridge by the user. With this, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

Furthermore, according to the above-described configuration, the standby position Y1 or Y2 of at least the part of the cutter unit 60 is located at the outside of the area passing through the conveyance route R in the scanning direction. With this, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

Moreover, according to the above-described configuration, in a case that the predetermined instruction input is received by the receiving part 101, the controller 102 causes at least the part of the cutter unit 60 to move to the standby position Y1 or Y2. With this, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

Further, according to the above-described configuration, in a case that the predetermined instruction input is received by the receiving part 101, the controller 102 causes at least the part of the cutter unit 60 to move to the standby position Y1 or Y2 and then the controller 102 causes the printing part 4 to move to the exchange position X. With this, it is possible to prevent the cartridge 142 from being exchanged before at least the part of the cutter unit 60 is moved to the standby position Y1 or Y2. Accordingly, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<First Modification>

A cover 110 may be provided on the casing 11. Here, an arrangement of the exchange position X in a case that the cover 110 is provided on the casing 11 will be explained by using FIG. 6.

Figure 6:
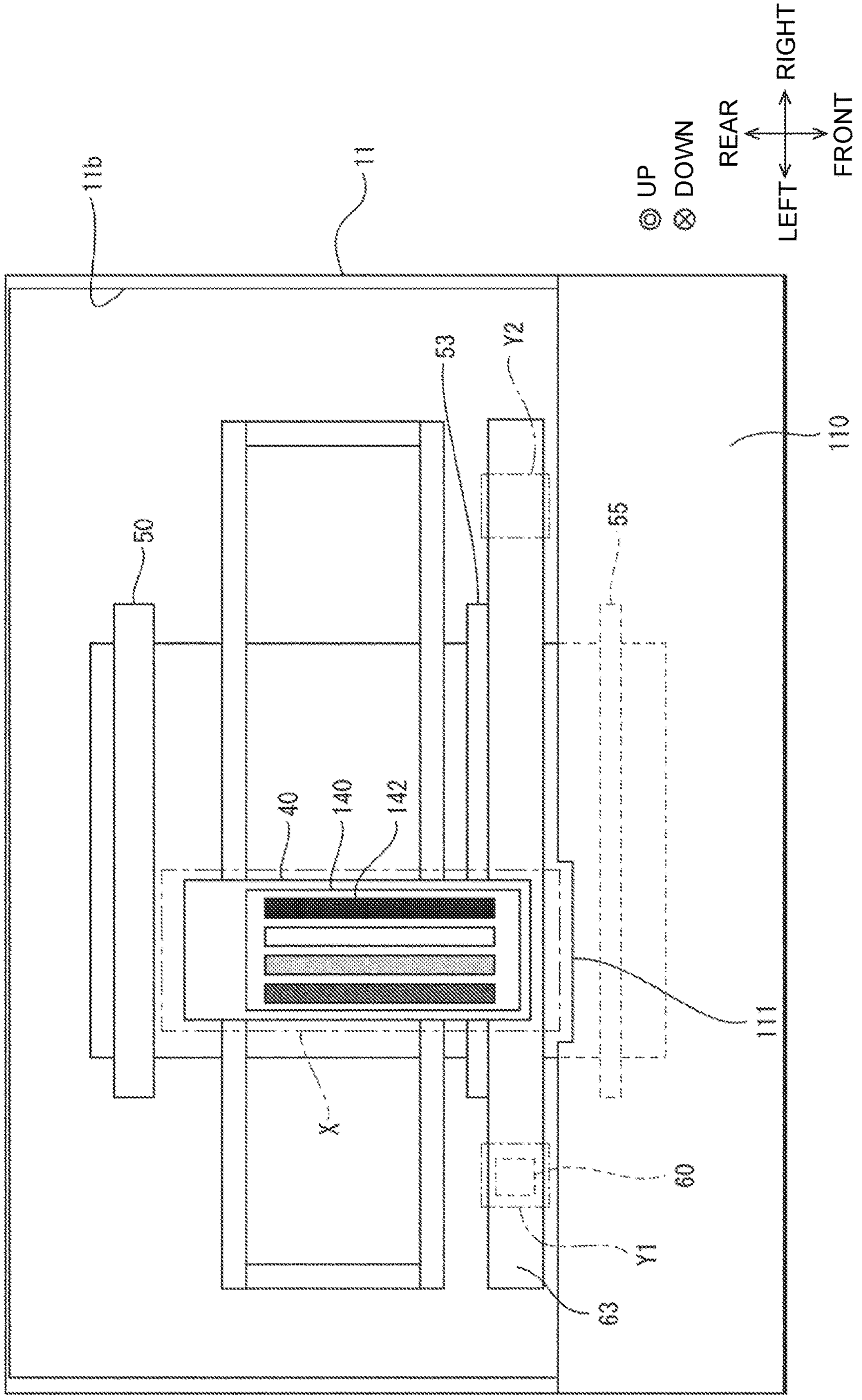
FIG. 6 is a schematic view depicting an example of arrangement of the exchange position of the cartridge in the printing apparatus according to the first embodiment.

As depicted in FIG. 6, the cover 110 configured to cover a part of the opening **11*b* is provided on the casing 11. A recessed part 111 is formed in the cover 110. Further, in a case that the carriage 40 is located at the exchange position X, the recessed part 111 is arranged at a position at which a position in the scanning direction of at least a part of the recessed part 111 is coincident with a position in the scanning direction of the carriage 40. In other words, the carriage 40 located at the exchange position X and the recessed part 111 are arranged, respectively, at positions at which at least a part of the carriage 40 and at least a part of the recessed part 111 overlap in the up-down direction in the front view. Further, the recessed part 111 is provided at a position above the instalment part 140 of the carriage 40** in the up-down direction.

In such a manner, the exchange position X and the recessed part 111 have the positions in the scanning direction which are overlapped. Further, the recessed part 111 is located at the position above the installment part 140. Accordingly, it is possible to take out the cartridge 142 via the opening **11*b* of the upper surface of the casing 11, and the cover 111 does not hinder the exchange of the cartridge 142. Furthermore, the exchange position X is shifted in the scanning direction with respect to the standby position Y1 or Y2. Accordingly, in the case that the cartridge 142 is being exchanged, it is possible to suppress occurrence of such a situation that the user makes contact with the cutter unit 60 or to suppress occurrence of such a situation that the cartridge 142 and the cutter unit 60** make contact with each other.

<Second Modification>

Another example of the arrangement of the exchange position X will be explained by using FIG. 7.

Figure 7:
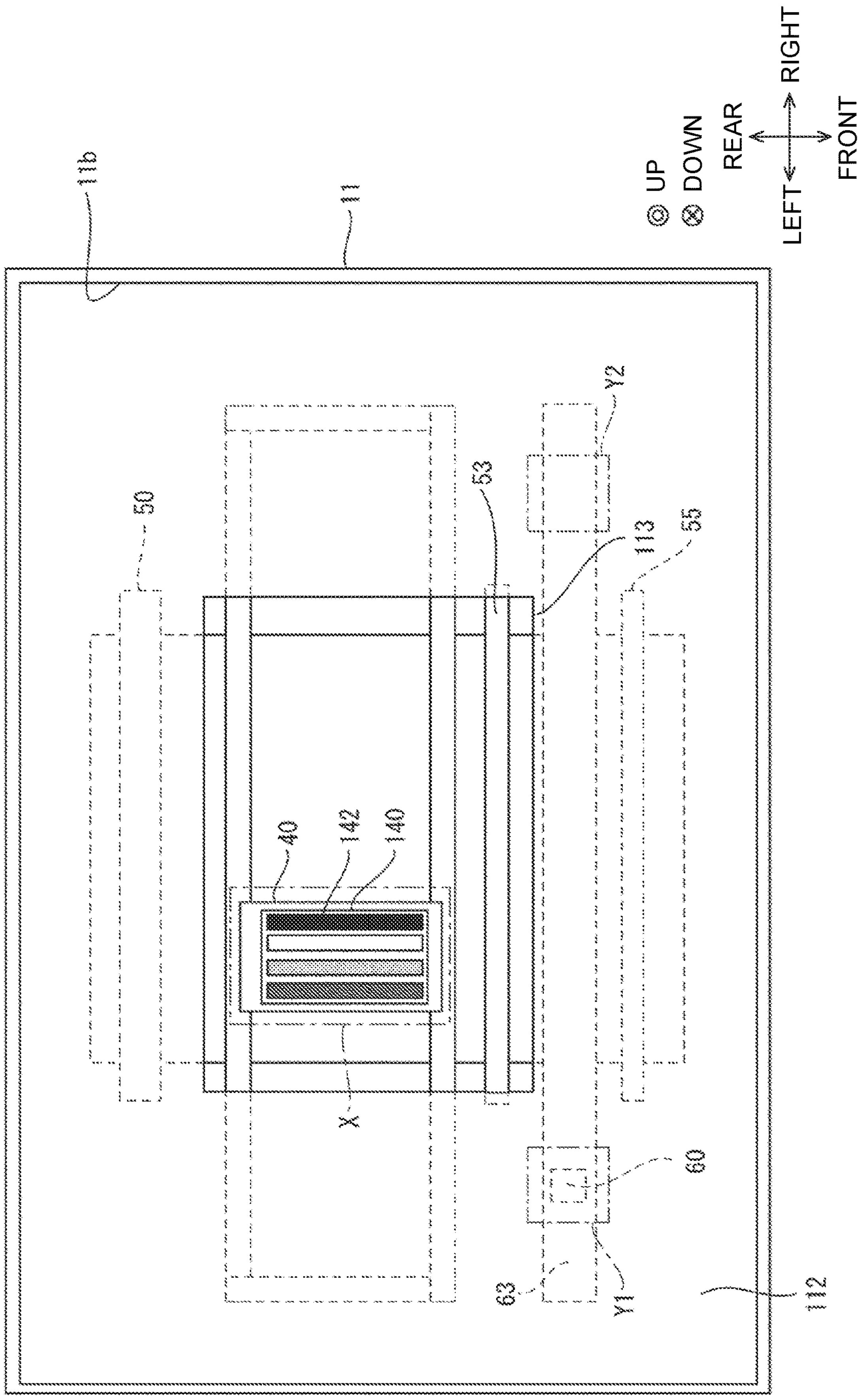
FIG. 7 is a schematic view depicting another example of the arrangement of the exchange position of the cartridge in the printing apparatus according to the first embodiment.

As depicted in FIG. 7, a cover 112 configured to cover a part of the opening **11*b* is provided on the casing 11. The cover 112 is an example of a "shielding part" configured to shield at least a part of the cutter unit 60. The cover 112 shields the cutter unit 60 positioned at the standby position Y1 or Y2 from outside of the casing 11**.

Further, an opening 113 is formed or defined in the cover 112. In a case that the carriage 40 is located at the exchange position X, the opening 113 is arranged at a position at which a position in the scanning direction of at least a part of the opening 113 is coincident with a position in the scanning direction of the carriage 40. Further, the opening 113 is provided at a position above the instalment part 140 of the carriage 40 in the up-down direction.

In such a manner, the exchange position X and the opening 113 have the positions in the scanning direction which are overlapped. Further, the opening 113 is located at the position above the installment part 140. Accordingly, it is possible to take out the cartridge 142 from the upper surface of the casing 11, and the cover 112 does not hinder the exchange of the cartridge 142. Furthermore, the standby position Y1 or Y2 at which at least the part of the cutter unit 60 is located in the case that the cartridge 142 is being exchanged is shielded by the cover 112 from the outside of the casing 11. Accordingly, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

<Third Modification>

Figure 8:
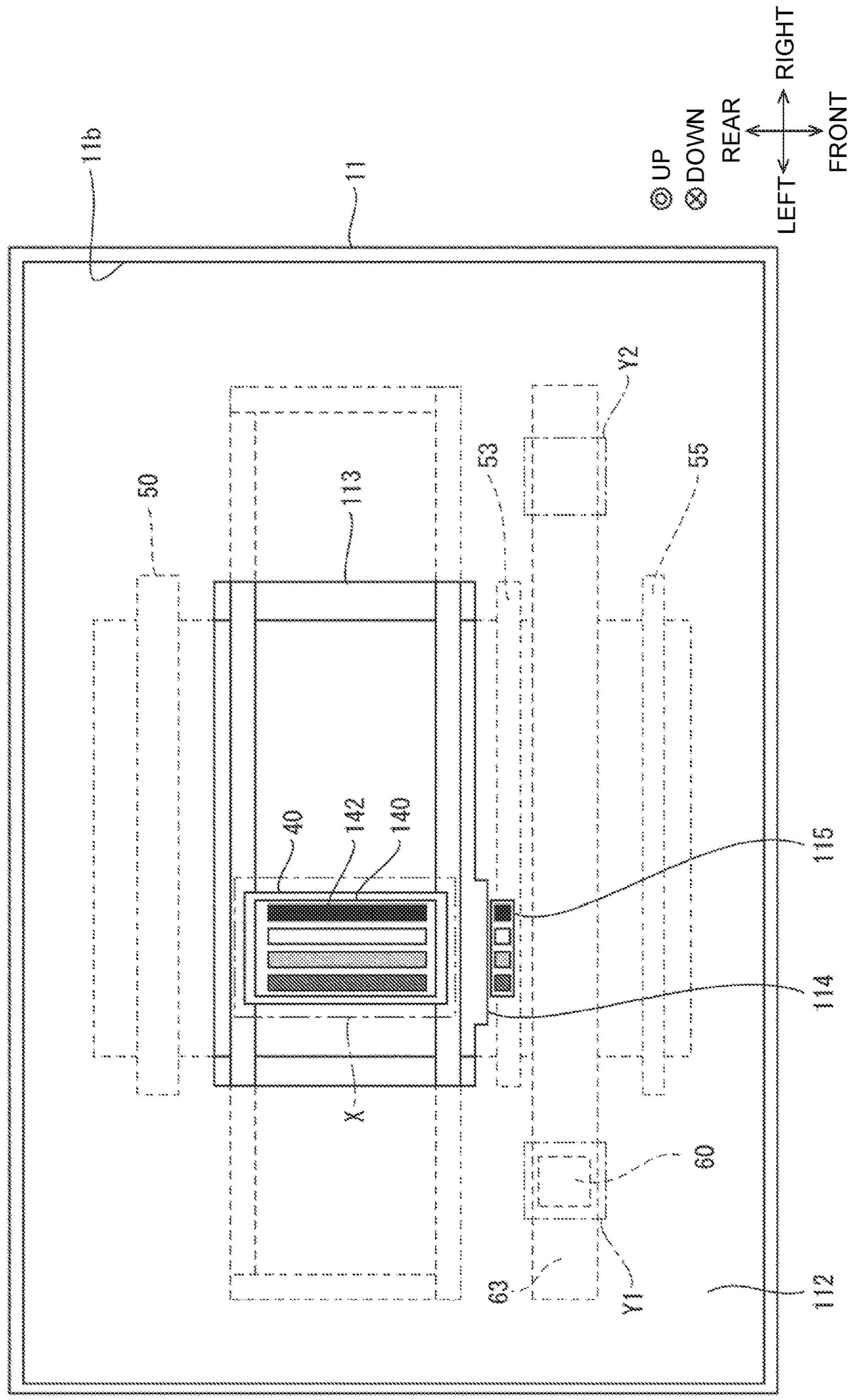
FIG. 8 is a schematic view depicting another example of the arrangement of the exchange position of the cartridge in the printing apparatus according to the first embodiment.

Further, a recessed part 114 may be further formed in the opening 113 of the second modification, as depicted in FIG. 8. As depicted in FIG. 8, in a case that the carriage 40 is located at the exchange position X, each of the opening 113 and the recessed part 114 is arranged at a position at which a position in the scanning direction of at least a part of each of the opening 113 and the recessed part 114 is coincident with a position in the scanning direction of the carriage 40. In other words, the carriage 40 which is located at the exchange position X in the area of the opening 113 and the recessed part 114 are arranged, respectively, at positions at which at least a part of the carriage 40 and at least a part of the recessed part 114 overlap in the up-down direction in the front view. Further, each of the opening 113 and the recessed part 114 is provided at a position above the instalment part 140 of the carriage 40 in the up-down direction.

Further, it is allowable that a displaying part 115 configured to display the alignment of colors of the cartridges 142 is provided in the vicinity of the recessed part 114 of the cover 112. The displaying part 115 is, as an example, a sticker representing colors corresponding to the alignment in the left-right direction of the cartridges 142. In the displaying part 115, the sticker representing the colors of the cartridges 142 are adhered to the cover 112, with colors which are in an alignment (arrangement) in the left-right direction which is same as the alignment of colors of the cartridges 142. As an example, a sticker indicating the black, yellow, cyan and magenta colors in this order from the right side is adhered to the displaying part 115.

In such a manner, the exchange position X, and the opening 113 and the recessed part 114 have the positions in the scanning direction which are overlapped. Further, the opening 113 and the recessed part 114 are located above the installment part 140. Accordingly, it is possible to take out the cartridge 142 from the upper surface of the casing 11, and the cover 112 does not hinder the exchange of the cartridge 142. Further, in the case that the cartridge 142 is being exchanged, the standby position Y1 or Y2 at which at least the part of the cutter unit 60 is positioned is shielded by the cover 112 from the outside of the casing 11. Thus, in the case that the cartridge 142 is being exchanged, it is possible to suppress occurrence of such a situation that the user makes contact with the cutter unit 60 or to suppress occurrence of such a situation that the cartridge 142 and the cutter unit 60 make contact with each other.

<Fourth Modification>

In the above-described embodiment, the carriage 40 and the cutter unit 60 are arranged, respectively, at the positions which are shifted in the front-rear direction. The positional relationship between the carriage 40 and the cutter unit 60, however, is not limited to this. In view of this, a modification of the positional relationship between the carriage 40 and the cutter unit 60 will be explained by using FIG. 9.

As depicted in FIG. 9, the cutter unit 601 has a blade 611 constructing a movable part which is movable in the scanning direction, a cutter carriage 612, a blade 613 and a cutter supporting part 614. The cutter supporting part 614 is fixed to the casing 11 and is provided to extend in the left-right direction. The blade 613 is fixed to the cutter supporting part 614 and is, for example, a fixed blade provided to extend in the left-right direction. The blade 613 is fixed to the cutter supporting part 614.

Further, the entirety of the cutter unit 601 overlaps with the carriage 410 as seen from a direction along the up-down direction. Namely, the cutter unit 601 is arranged at a position below the carriage 410 in the up-down direction, and the position in the front-rear direction of the cutter unit 601 and the position in the front-rear direction of the carriage 410 overlap with each other. Accordingly, it is possible to reduce, in the front-rear direction, an arrangement space of the carriage 410 and the cutter unit 601 in the inside of the casing 11, thereby making it possible to make the printing apparatus 1 to be small-sized in the front-rear direction.

Figure 10:
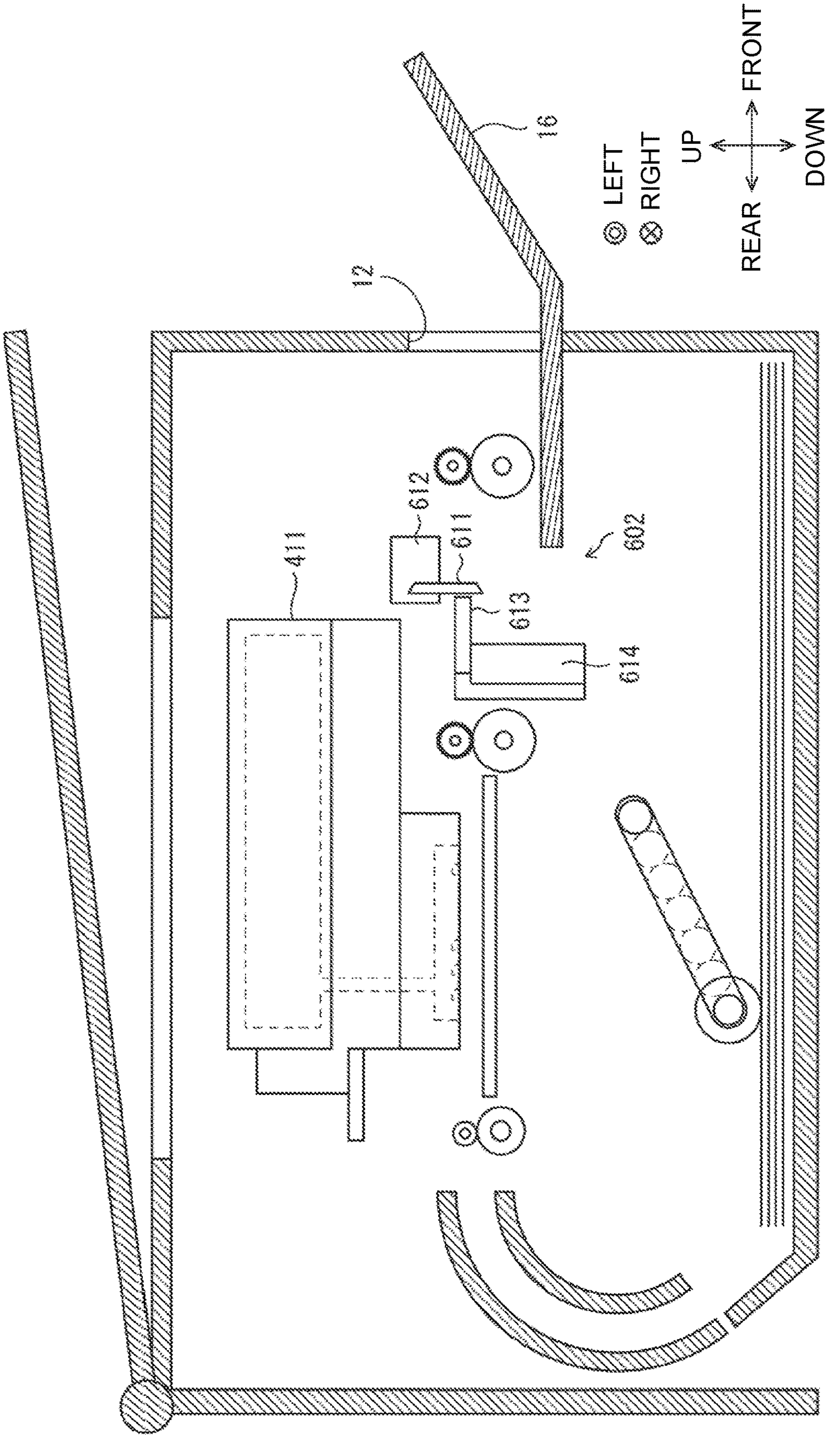
FIG. 10 is a schematic view depicting another example of the positional relationship between the carriage and the cutter unit in the printing apparatus according to the first embodiment.

Further, another modification of the positional relationship between the carriage 40 and the cutter unit 60 will be explained by using FIG. 10. It is allowable that at least a part of a cutter unit 602 overlaps with a carriage 411 as seen from the direction along the up-down direction. As an example, a blade 613 which is a first blade fixed to the casing 11 in the cutter unit 602 overlaps with the carriage 411 as seen from the direction along the up-down direction. As depicted in FIG. 10, the blade 613 and a cutter supporting part 614 are arranged at a location below the carriage 411, whereas the blade 611 and the cutter carriage 612 are not arranged at the location below the carriage 411.

In such a manner, also in the configuration wherein a part of the cutter unit 602 is arranged at the location below the carriage 411, it is possible to reduce, in the front-rear direction, an arrangement space of the carriage 411 and the cutter unit 602 in the inside of the casing 11, thereby making it possible to make the printing apparatus 1 to be small-sized in the front-rear direction.

Figure 11:
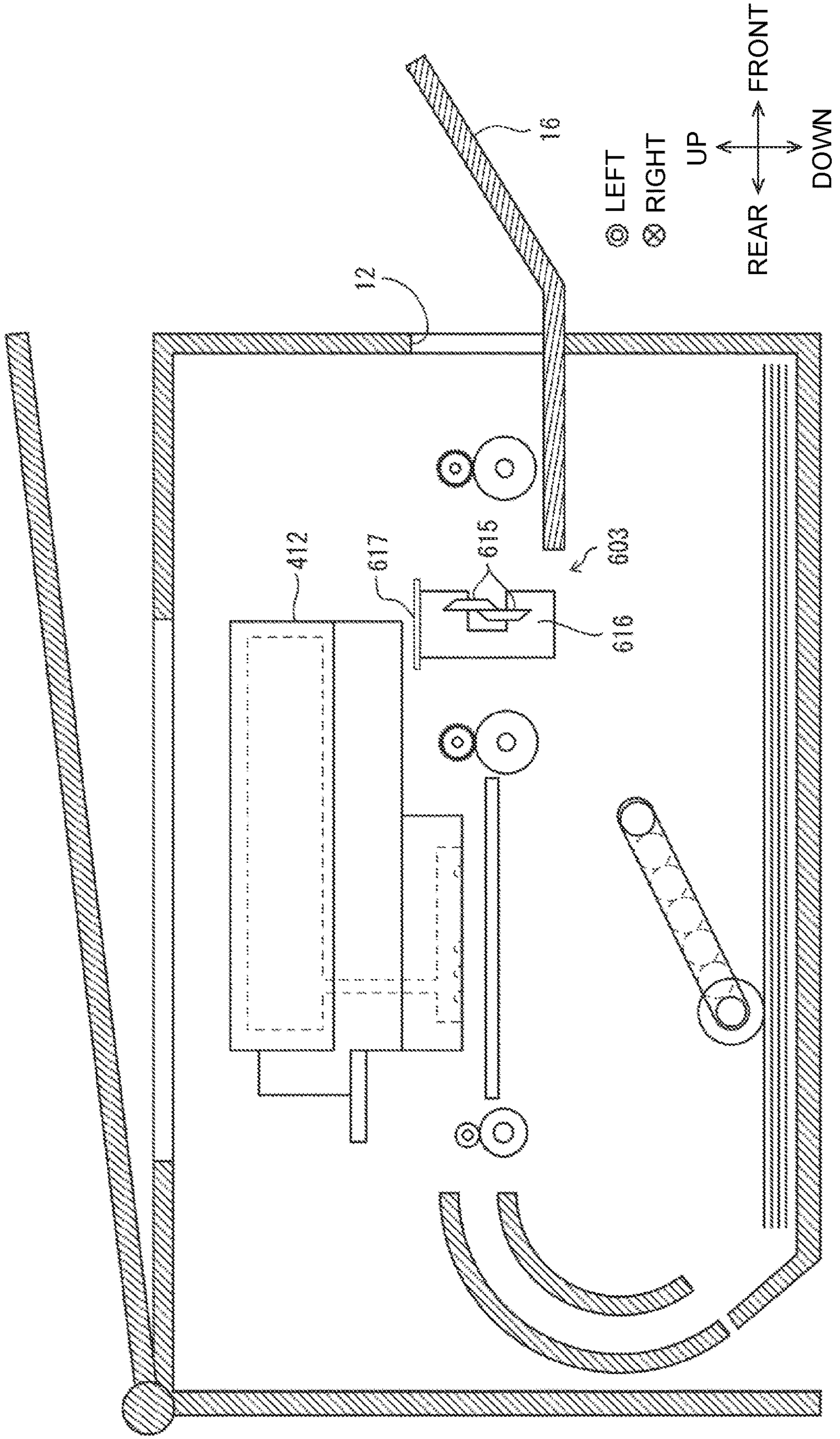
FIG. 11 is a schematic view depicting another example of the positional relationship between the carriage and the cutter unit in the printing apparatus according to the first embodiment.

Furthermore, yet another modification of the positional relationship between the carriage 40 and the cutter unit 60 will be explained by using FIG. 11. As depicted in FIG. 11, in a configuration wherein a cuter unit 603 is supported by a rail 617, the rail 617 may overlap with a carriage 412 as seen from a direction along the up-down direction. The cutter unit 603 is provided with a pair of upper and lower blades 615, a cutter carriage 616 configured to support the pair of upper and lower blades 615, and the rail 617 configured to cause the cutter carriage 616 to scan. Further, the rail 617 and the cutter carriage 616 are arranged at a location below the carriage 412, whereas the pair of upper and lower blades 615 is not arranged at the location below the carriage 412.

In such a manner, also in the configuration wherein a part of the cutter unit 603 is arranged at the location below the carriage 412, it is possible to reduce, in the front-rear direction, an arrangement space of the carriage 412 and the cutter unit 603 in the inside of the casing 11, thereby making it possible to make the printing apparatus 1 to be small-sized in the front-rear direction.

<Fifth Modification>

Figure 12:
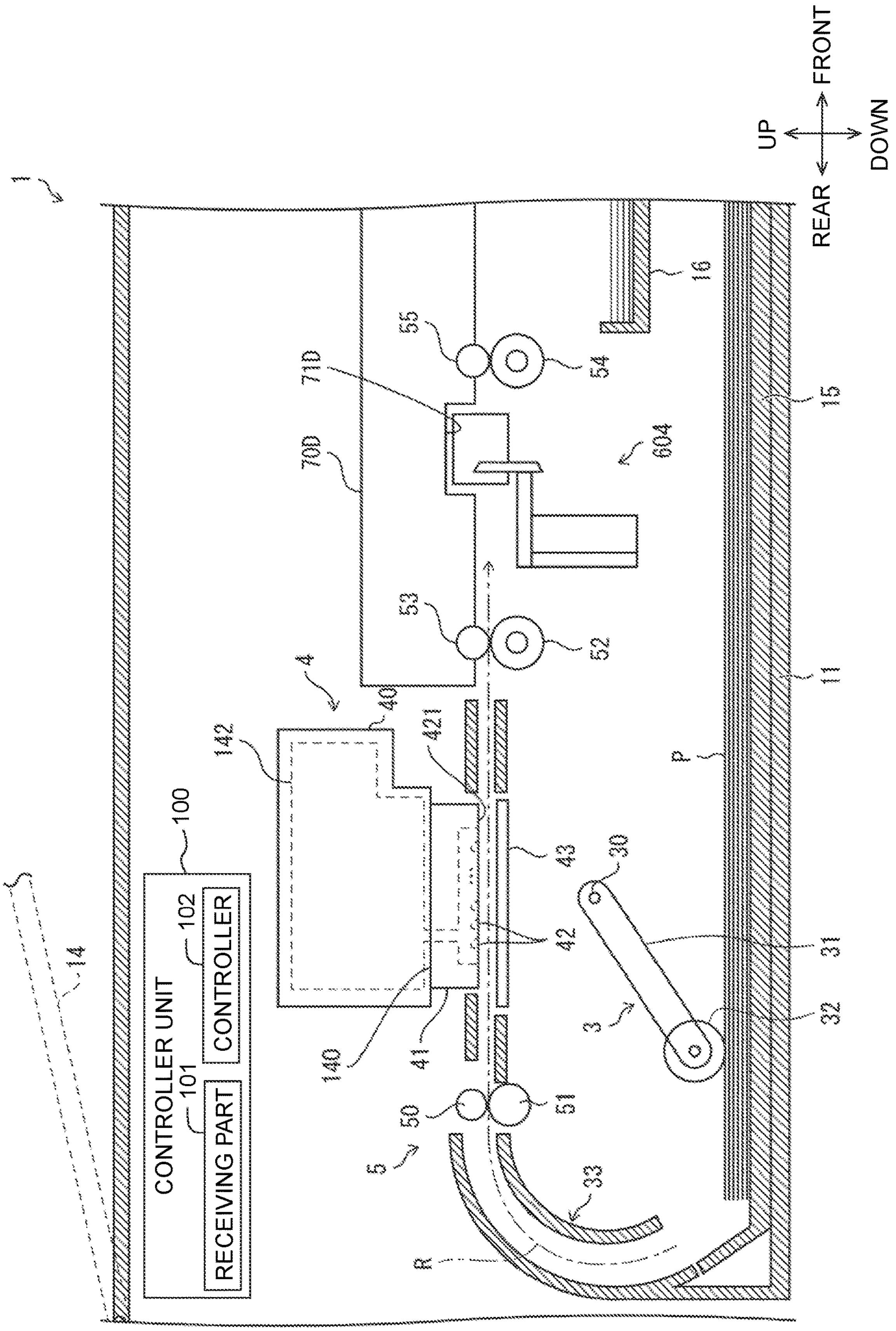
FIG. 12 is a schematic view depicting an example of a shielding part of the cutter unit in the printing apparatus according to the first embodiment.

Another example of the shielding part will be explained by using FIG. 12. FIG. 12 is a schematic view depicting an example of the shielding part of the cutter unit in the printing apparatus according to the first embodiment. As depicted in FIG. 12, a holder 70D is an example of the shielding part configured to shield a cutter unit 604, and the holder 70D holds spur rollers 53 and 55. A recessed part 71D is formed in a lower surface of the holder 70D, and a cutter carriage of the cutter unit 604 is arranged in a space surrounded by the recessed part 71D. The spur rollers 53 and 55 are each an example of a guide member configured to guide a sheet P having an image printed thereon to the conveyance direction.

Further, the holder 70D shields at least a part of the cutter unit 604 from the outside of the casing 11. For example, the holder 70D may cover an upper part of the cutter unit 604. The holder 70D provides both of a function of holding the spur rollers 53 and 55 and a function of shielding at least a part of the cutter unit 604 from the outside of the casing 11.

According to the above-described configuration, since at least the part of the cutter unit 604 can be shielded by the holder 70D configured to hold the spur rollers 53 and 55 which guide the sheet P to the conveyance direction, there is no need to newly provide a member configured to shield the cuter unit 604. Accordingly, the manufacturing cost of the printing apparatus 1 can be reduced.

Second Embodiment

A second embodiment of the present disclosure will be explained below. Note that for the sake of convenience of explanation, a same reference numeral is affixed to a member, of the second embodiment, which has the same function as that of the member explained in the first embodiment, and the explanation therefor will not be repeated.

A printing apparatus 2 of the second embodiment will be explained by using FIGS. 13 to 16.

Figure 13:
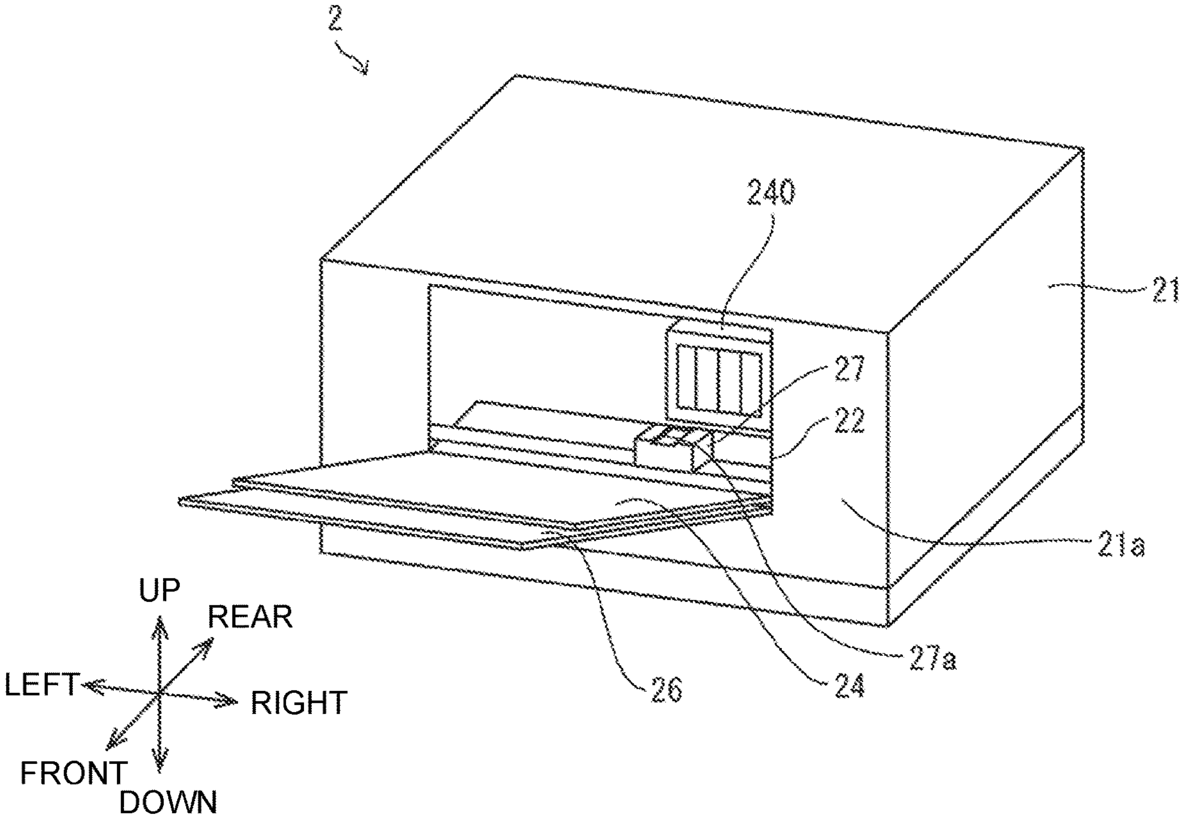
FIG. 13 is a schematic perspective view of a printing apparatus according to a second embodiment.

The printing apparatus 2 depicted in FIG. 13 is an example of an ink-jet printer. In the following explanation, the up-down direction is defined, with a state in which the printing apparatus 2 is installed usably, as depicted in FIG. 13, as the reference, with a surface on which the printing apparatus 2 is installed being defined as downward; the front-rear direction is defined, with a side on which an opening 22 is formed is defined as a front side; and the left-right direction is defined, with the printing apparatus 2 as seen from the front side.

Figure 14:
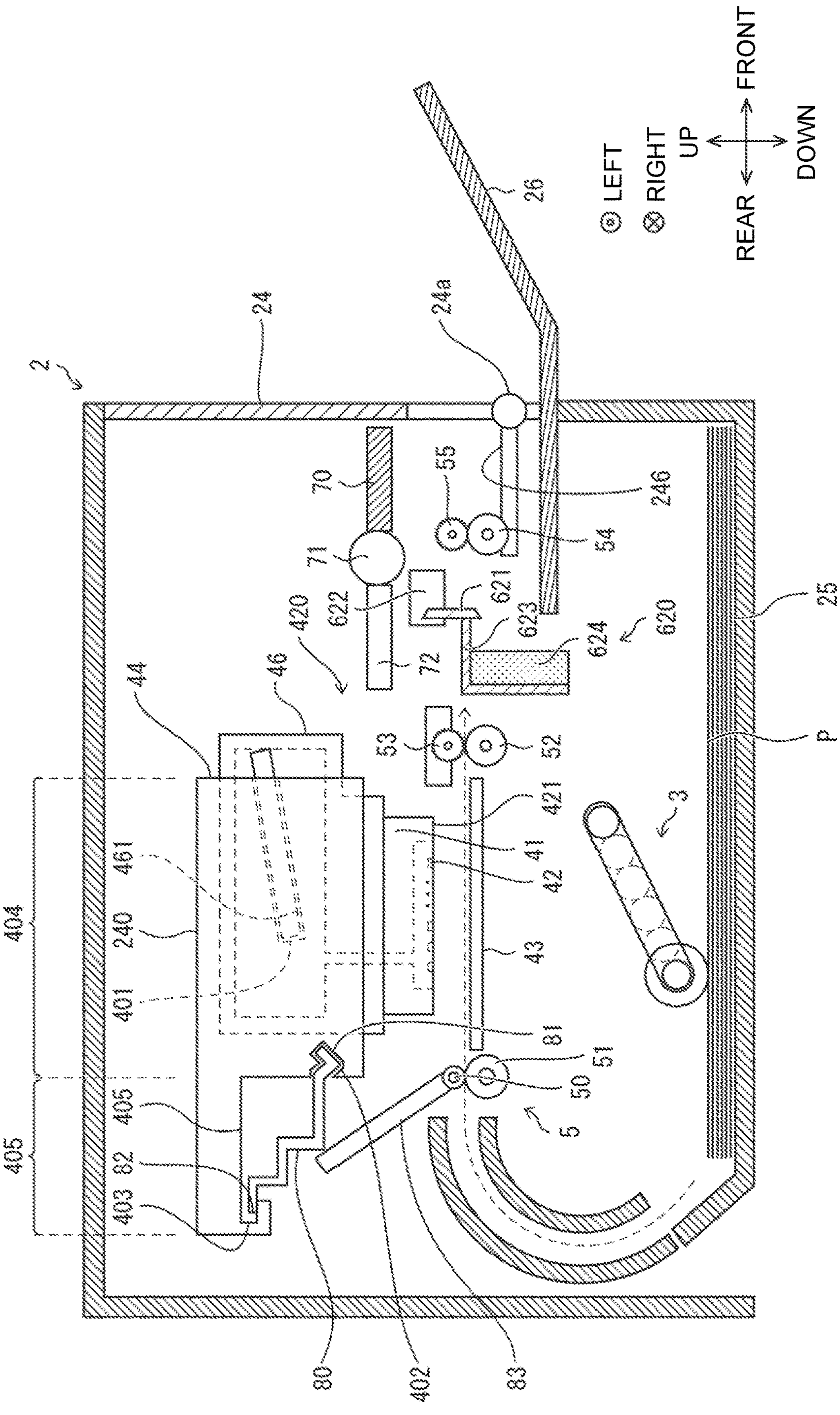
FIG. 14 is a cross-sectional view schematically depicting the internal configuration of the printing apparatus according to the second embodiment, in a side view.

Note that there is such a case that the front-rear direction is referred to as a conveyance direction of a sheet P, which is an example of a print medium, by a conveyor 5 (see FIG. 14). Further, there is such a case that an upstream side in the conveyance direction is referred to as the "rear side", and a downstream side in the conveyance direction is referred to as the "front side". Furthermore, there is such a case that the left-right direction is referred to as a scanning direction which is a moving direction of a carriage 240 (see FIG. 14, to be described later on). Moreover, there is such a case that the up-down direction is referred to as a direction orthogonal to a nozzle surface 421 of a recording head 41 (see FIG. 14). Further, there is such a case that the up-down direction is referred to as a direction crossing the above-described conveyance direction and scanning direction.

As depicted in FIG. 13, the printing apparatus 2 forms, as a whole, a substantially rectangular parallelepiped shape with a casing 21. The opening 22 is formed (defined) in a front wall 21*a* of the casing 21. A cover 24 is provided on the front wall 21*a*. The cover 24 is provided to be movable to a first position at which the cover 24 covers the opening 22 and to a second position at which the cover 24 release the opening 22. Specifically, the cover 24 is provided to be rotatable with respect to the front wall 21*a* via a rotation shaft 24*a* (see FIG. 14).

The first position is a position of the cover 24 as depicted in FIG. 14, and the second position is a position of the cover 24 as depicted in FIG. 13. The opening 22 is located at a position at which the cover 24 is capable of releasing, to an outside of the casing 21, a part, in an installment part 44, on the downstream side in the conveyance direction of the sheet P, in a case that the cover 24 is positioned at the second position.

A feed tray 25 (see FIG. 14) and a discharge tray 26 are detachably installed, via the opening 22, with respect to the printing apparatus 2. The feed tray 25 accommodates a plurality of pieces of the sheet P, and an upper surface of the feed tray 25 is opened. The discharge tray 26 is arranged at a location above the feed tray 25. A sheet P, having printing performed thereon by a printing part 420 (see FIG. 14) is discharged to the discharge tray 26.

A guiding part 27 configured to guide a lower surface of the cartridge 46 (see FIG. 14) in a case that the cartridge 46 is being exchanged is provided between the front wall 21*a* of the casing 21 and the carriage 240. The guiding part 27 is arranged at a position at which a position in the scanning direction of the guiding part 27 is coincident with an exchange position X1 (see FIG. 15, to be described later on) of the carriage 240. It is allowable that the guiding part 27 is provided to be scannable in a rail extending in the left-right direction, and that the guiding part 27 is configured to be movable to a position at which the position in the scanning direction of the guiding part 27 is coincident with the exchange position X1 in the case that the cartridge 46 is being exchanged.

A groove 27*a* having a width corresponding to the lower surface of the cartridge 46 is formed in an upper surface of the guiding part 27. By inserting the cartridge 46 along the groove 27*a* in the upper surface of the guiding part 27, it is possible to guide the cartridge 46 with respect to the installment part 44 (see FIG. 14) of the carriage 240. Note that only one piece of the groove 27*a* may be provided on the upper surface of the guiding part 27, or two or more pieces of the groove 27*a* are provided on the upper surface of the guiding part 27. Although a width in the left-right direction of the guiding part 27 may be a width which is capable of guiding a part of the cartridge 46 which is being installed in the installment part 44 of the carriage 240, the width in the left-right direction of the guiding part 27 may be a width capable of guiding entirety of the cartridge 46 at a time. In a case that the width in the left-right direction of the guiding part 27 is the width capable of guiding the part of the cartridge 46, a position in the left-right direction of the guiding part 27 is moved in accordance with a position of a cartridge 46 which is to be exchanged for a new cartridge 46.

As depicted in FIG. 14, the printing part 420 is arranged at a location above the feeding part 3. The printing part 420 is constructed of the carriage 240. A recording head 41, which is an example of a liquid discharging head, is installed in the carriage 240. The recording head 41 has a plurality of nozzles 42. A platen 43 is positioned at a location below the carriage 240.

The carriage 240 has the installment part 44 in which the cartridge 46 is installed. The carriage 240 has a front part 404 and a rear part 405. The front part 404 is a part configured to hold the cartridge 46, and the rear part 405 is a part extending rearward from a rear end of the front part 404.

The installment part 44 is provided on the front part 404, at a part thereof which is opened on the front side. The installment part 44 is a part, in the front part 404 of the head carriage 240, in which the cartridge 46 is installed in a case that the cartridge 46 is installed in the installment part 44. A recessed part 401 is formed in the installment part 44. In the case that the cartridge 46 is installed in the installment part 44, a projected part 461 provided on a surface of the cartridge 46 fits into the recessed part 401.

The printing apparatus 2 is provided with a supporting frame 80 and a sheet metal 83. The supporting frame 80 is provided to extend in the left-right direction, and movably supports the carriage 240. A lower end part 81 of the supporting frame 80 fits into a recessed part 402 formed in a rear end surface of the front part 404 of the carriage 240. An upper end part 82 of the supporting frame 80 fits into a recessed part 403 formed in a lower end of a rear part of the rear part 405 of the carriage 240. The carriage 240 moves reciprocally in the left-right direction along the supporting frame 80. The sheet metal 83 supports a pinch roller 50 and supports the supporting frame 80.

A cutter unit 602 has a blade 621 constructing a movable part which is movable in the scanning direction, a cutter carriage 622, a blade 623 and a cutter supporting part 624. The cutter supporting part 624 is fixed to the casing 21 and is provided to extend in the left-right direction. The blade 623 is fixed to the cutter supporting part 624 and which is, for example, a fixed blade provided to extend in the left-right direction. The blade 623 is fixed to the cutter supporting part 624.

The printing apparatus 2 is provided with a shielding part 70. The shielding part 70 is provided rotatably on the inside of the casing 21. Specifically, the shielding part 70 is provided rotatably on a rotation shaft 71. The rotation shaft 71 is arranged, in the front-rear direction, between the cutter unit 620 and a spur roller 55. The rotation shaft 71 is configured to rotate the shielding part 70 and a second contact part 72. The second contact part 72 is provided on the rotation shaft 71 and rotates accompanying with the rotation of the shielding part 70. Specifically, the second contact part 72 rotates while maintaining a relative position of the second contact part 72 with respect to the shielding part 70. The second contact part 72 and the shielding part 70 may be arranged together along a same plane.

In a case that the cover 24 is positioned at the second position depicted in FIG. 13, the shielding part 70 shields at least a part of the cutter unit 620 from outside of the casing 21. In the case that the cover 24 is positioned at the second position, the shielding part 70 is arranged at a location above the cutter unit 620, and the second contact part 72 is arranged at a location below a first contact part 246.

Figure 15:
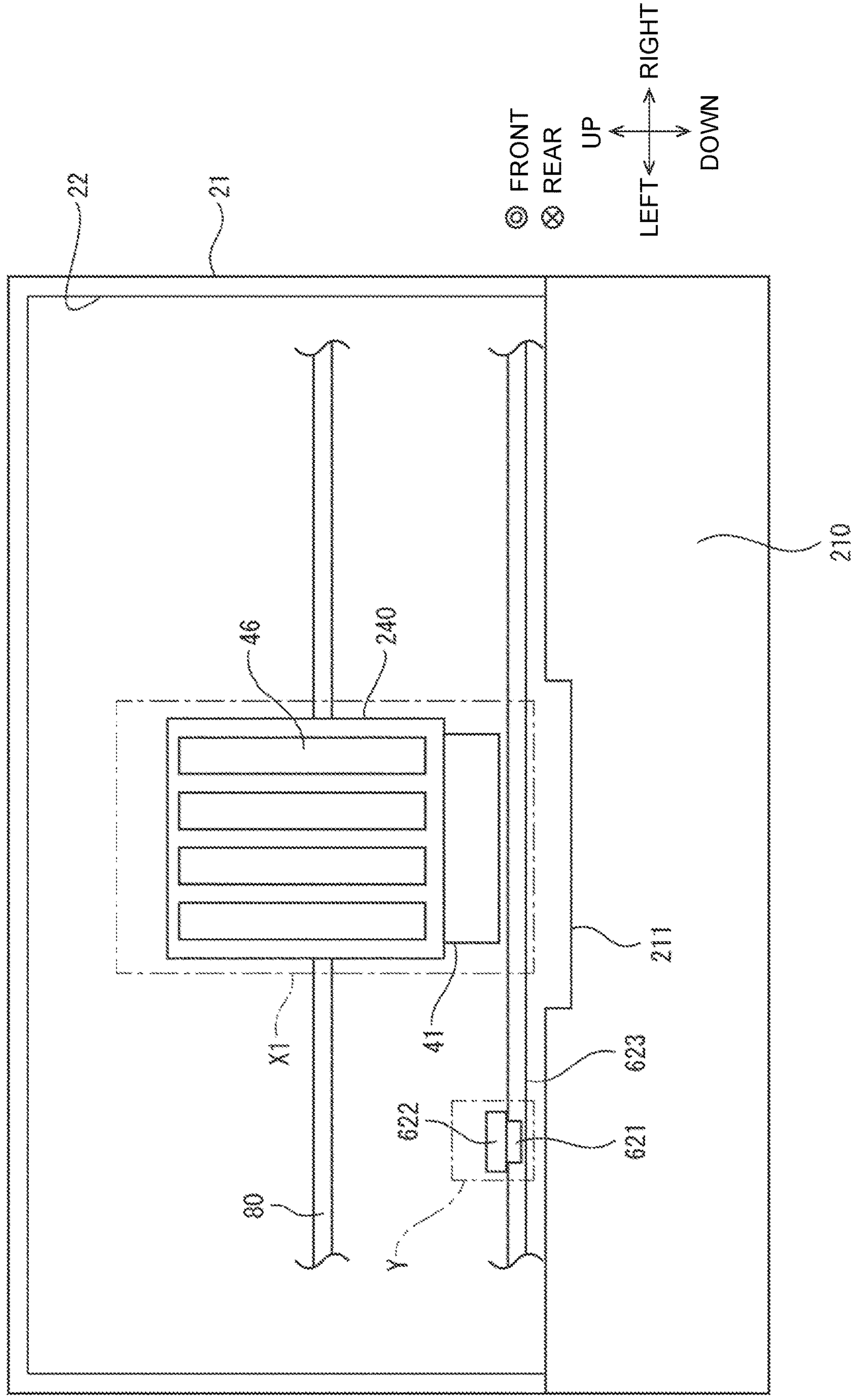
FIG. 15 is a schematic view depicting an example of an exchange position of a cartridge in the printing apparatus according to the second embodiment.

The cartridge 46 is detachably installable with respect to the installment part 44. Further, as depicted in FIG. 15, in a case that the carriage 240 is located at the predetermined exchange position X1 in the left-right direction, the cartridge 46 is installable or detachable with respect to the installment part 44. The carriage 240 is movable to the predetermined exchange position X1 in the left-right direction. Further, in a case that the cartridge 46 is being installed or detached with respect to the carriage 240, the blade 621 and the cutter carriage 620 each of which is a part of the cutter unit 620 are positioned at a standby position Y which is shifted in the scanning direction with respect to the exchange position X1.

With this, in the case that the cartridge 46 is being exchanged, it is possible to prevent the user from making contact with the blade 621 and the cutter carriage 622 or to prevent the cartridge 46, and the blade 621 and the cutter carriage 622 from making contact with each other.

Further, as depicted in FIG. 15, the casing 21 may be provided with a cover 210 configured to cover a part of the opening 22 provided on the front surface of the casing 21. A recessed part 211 is formed in the cover 210. Furthermore, in a case that the carriage 240 is located at the exchange position X1, the recessed part 211 is arranged at a position at which a position in the scanning direction of at least a part of the recessed part 211 is coincident with a position in the scanning direction of the carriage 240. In other words, the carriage 240 located at the exchange position X1 and the recessed part 211 are arranged, respectively, at positions at which at least a part of the carriage 240 and at least a part of the recessed part 211 overlap in the up-down direction in the front view. Further, the recessed part 211 is provided at a position on the downstream in the conveyance direction of the sheet P with respect to the instalment part 44 of the carriage 240.

In such a manner, the exchange position X1 and the recessed part 211 have the positions in the scanning direction which are overlapped. Further, the recessed part 211 is located at the position in front of the installment part 44. Accordingly, it is possible to take out the cartridge 46 via the opening 22 of the front surface of the casing 21, and the cover 210 does not hinder the exchange of the cartridge 46.

Figure 16:
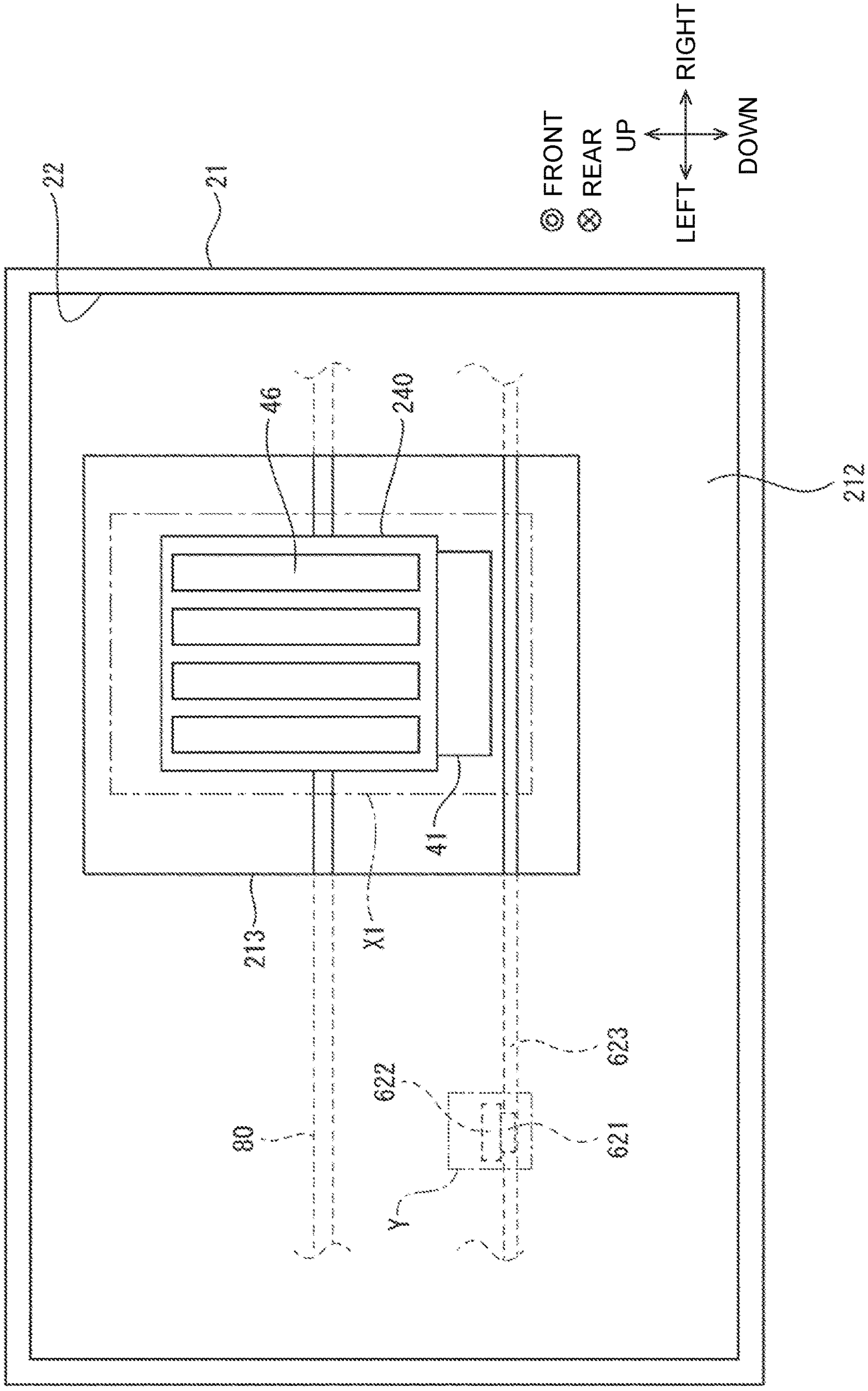
FIG. 16 is a schematic view depicting another example of the exchange position of the cartridge in the printing apparatus according to the second embodiment.

Further, as depicted in FIG. 16, the casing 21 may be provided with a cover 212 configured to cover a part of the opening 22. The cover 212 is an example of the "shielding part" configured to shield at least a part of the cutter unit. The cover 212 shields the blade 621 and the cutter carriage 622 located at a standby position Y from the outside of the casing 21.

Furthermore, an opening 213 may be formed (defined) in the cover 212. In a case that the carriage 240 is located at the exchange position X1, the opening 213 is arranged at a position at which a position in the scanning direction of at least a part of the opening 213 is coincident with a position in the scanning direction of the carriage 240. In other words, the carriage 240 located at the exchange position X1 in an area of the opening 213 and the opening 213 are arranged, respectively, at positions at which at least a part of the carriage 240 and at least a part of the opening 213 overlap in the up-down direction in the front view. Further, the opening 213 is provided at a position on the downstream in the conveyance direction of the sheet P with respect to the installment part 44 of the carriage 240.

In such a manner, the exchange position X1 and the opening 213 have the positions in the scanning direction which are overlapped. Further, the opening 213 is located in front of the installment part 44. Accordingly, it is possible to take out the cartridge 46 from the front surface of the casing 21, and the cover 212 does not hinder the exchange of the cartridge 46. Further, the standby position at which the blade 621 and the cutter carriage 622, each of which is the part of the cutter unit 60, are positioned in the case that the cartridge 46 is being exchanged is shielded, by the cover 212, from the outside of the casing 21. Accordingly, in the case that the cartridge 46 is being exchanged, it is possible to prevent the user from making contact with the blade 621 and the cutter carriage 622 or to prevent the cartridge 46, and the blade 621 and the cutter carriage 622 from making contact with each other.

Figure 17:
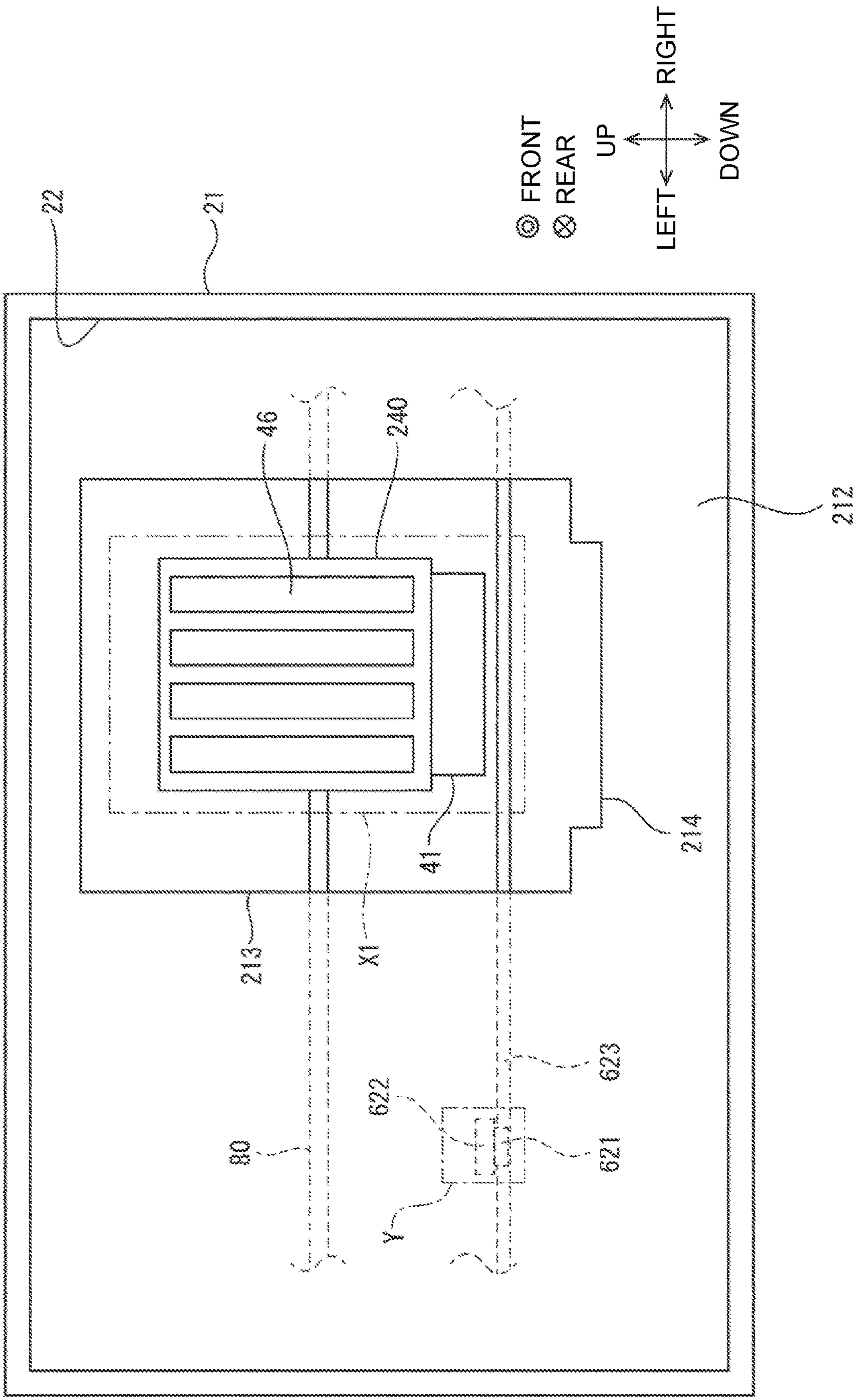
FIG. 17 is a schematic view depicting another example of the exchange position of the cartridge in the printing apparatus according to the second embodiment.

Furthermore, as depicted in FIG. 17, a recessed part 214 may be further formed in the opening 213. In a case that the carriage 240 is located at the exchange position X1, each of the opening 213 and the recessed part 214 is arranged at a position at which a position in the scanning direction of at least a part of each of the opening 213 and the recessed part 214 is coincident with a position in the scanning direction of the carriage 240. Further, each of the opening 213 and the recessed part 214 is provided at a position on the downstream in the conveyance direction of the sheet P with respect to the installment part 44 of the carriage 240.

In such a manner, the exchange position X1, and the opening 213 and the recessed part 214 have the positions in the scanning direction which are overlapped. Further, each of the opening 213 and the recessed part 214 is located in front of the installment part 44. Accordingly, it is possible to take out the cartridge 46 from the front surface of the casing 21, and the cover 212 does not hinder the exchange of the cartridge 46. Further, the standby position at which the blade 621 and the cutter carriage 622 are positioned in the case that the cartridge 46 is being exchanged is shielded, by the cover 212, from the outside of the casing 21. Accordingly, in the case that the cartridge 46 is being exchanged, it is possible to prevent the user from making contact with the blade 621 and the cutter carriage 622 or to prevent the cartridge 46, and the blade 621 and the cutter carriage 622 from making contact with each other.

The present disclosure is not limited to each of the embodiments described above, and various changes can be made within the scope indicated by the claims; an embodiment which is obtained by appropriately combining the technical means disclosed in the respective, different embodiments is also included in the technical scope of the present disclosure.

Note that the present disclosure may be realized also in the following aspect.

The printing apparatus according to an aspect of the present disclosure may further include a casing configured to accommodate the printing part and the processing unit, an opening or a recessed part, via which the cartridge is inserted or detached, being formed in the casing, wherein in a case that the printing part is located at the exchange position, the opening or the recessed part may be arranged at a position at which a position in the scanning direction of at least a part of the opening or the recessed part is coincident with a position in the scanning direction of the printing part.

The position in the scanning direction of at least a part of the exchange position is coincident with the position in the scanning direction of the opening or the recessed part which is formed in the casing. Accordingly, it is possible to insert or detach the cartridge with respect to the casing via the opening or the recessed part.

The printing apparatus according to the aspect of the present disclosure may further include a shielding part configured to shield the processing unit, wherein the shielding part may be configured to shield at least the part of the processing unit from an outside of the casing.

The printing apparatus is provided with the shielding part configured to shield at least the part of the processing unit from the outside of the casing. Accordingly, in a case that the cartridge is being exchanged, at least the part of the processing unit is in a state of being shielded from the outside of the casing. With this, in the case that the cartridge is being exchanged, it is possible to prevent the user from making contact with the processing unit, or prevent the cartridge and the processing unit from making contact with each other.

In the printing apparatus according to the aspect of the present disclosure, it is allowable that the opening or the recessed part may be provided on a position on a downstream, in a conveyance direction of the print medium, with respect to the installment part, or on a position above the installment part in the up-down direction.

By arranging the opening or the recessed part at the position on the downstream, in the conveyance direction of the print medium, with respect to the installment part, it is possible to insert or detach the cartridge from the front surface of the casing. By arranging the opening or the recessed part at the position above the installment part, it is possible to insert or detach the cartridge from the upper surface of the casing.

The printing apparatus according to the aspect of the present disclosure may further include a receiving part configured to receive an instruction input by a user; and a controller, wherein in a case that a predetermined instruction input is received by the receiving part, the controller may be configured to cause the printing part to move to the exchange position.

The controller causes the printing part to move to the exchange position, based on an instruction input, from the user, for exchanging the cartridge. With this, in the case that the cartridge is being exchanged, it is possible to prevent the user from making contact with the processing unit or prevent the cartridge and the processing unit from making contact with each other.

In the printing apparatus according to the aspect of the present disclosure, it is allowable that in a case that the processing unit is seen from a direction along an up-down direction which is a direction crossing a front-rear direction as a conveyance direction of the print medium and the scanning direction, at least the part of the processing unit overlaps with the printing part.

In a case that the processing unit is seen from the direction along the up-down direction, at least the part of the processing unit overlaps with the printing part. With this, it is possible to reduce, in the front-rear direction, an arrangement space of the printing part and the processing unit in the inside of the casing, thereby making it possible to make the printing apparatus to be small-sized.

In the printing apparatus according to the aspect of the present disclosure, it is allowable that, in a case that the processing unit is seen from the direction along the up-down direction, an entirety of the processing unit overlaps with the printing part.

In the case that the processing unit is seen from the direction along the up-down direction, the entirety of the processing unit overlaps with the printing part. With this, it is possible to reduce, in the front-rear direction, the arrangement space of the printing part and the processing unit in the inside of the casing, thereby making it possible to make the printing apparatus to be small-sized.

In the printing apparatus according to the aspect of the present disclosure, it is allowable that the processing unit is provided with: a first blade which is fixed to a casing configured to accommodate the printing part and the processing unit, and a movable part which is movable in the scanning direction and which is provided with a second blade; and it is allowable that, in a case that the first blade is seen from the direction along the up-down direction, the first blade overlaps with the printing part.

The first blade fixed to the casing of the processing unit overlaps with the printing part as seen from the direction along the up-down direction. With this, it is possible to reduce, in the front-rear direction, the arrangement space of the printing part and the processing unit in the inside of the casing, thereby making it possible to make the printing apparatus to be small-sized.

In the printing apparatus according to the aspect of the present disclosure, it is allowable that the processing unit is provided with a movable part which is movable in the scanning direction and which is provided with a blade, and a rail configured to cause the movable part to scan; and it is allowable that, in a case that the rail is seen from the direction along the up-down direction, the rail overlaps with the printing part.

The rail configured to cause the movable part of the processing unit to scan overlaps with the printing part as seen from the direction along the up-down direction. With this, it is possible to reduce, in the front-rear direction, the arrangement space of the printing part and the processing unit in the inside of the casing, thereby making it possible to make the printing apparatus to be small-sized.

The printing apparatus according to the aspect of the present disclosure may further include a conveyance route in which the print medium is conveyed, wherein the standby position may be located, in the scanning direction, outside an area in which the printing medium passes through the conveyance route.

The standby position is located, in the scanning direction, outside the area in which the printing medium passes through the conveyance route. With this, in the case that the cartridge is being exchanged, it is possible to prevent the user from making contact with the processing unit, or prevent the cartridge and the processing unit from making contact with each other.

In the printing apparatus according to the aspect of the present disclosure, it is allowable that, in the case that the predetermined instruction input is received by the receiving part, the controller is configured to cause at least the part of the processing unit to move to the standby position.

In the case that the predetermined instruction input is received by the receiving part, the controller is configured to cause at least the part of the processing unit to move to the standby position. With this, in the case that the cartridge is being exchanged, at least the part of the processing unit is positioned at the standby position. Accordingly, in the case that the cartridge is being exchanged, it is possible to prevent the user from making contact with the processing unit or prevent the cartridge and the processing unit from making contact with each other.

In the printing apparatus according to the aspect of the present disclosure, it is allowable that, in the case that the predetermined instruction input is received by the receiving part, the controller is configured to cause at least the part of the processing unit to move to the standby position and then to cause the printing part to move to the exchange position.

In the case that the predetermined instruction input is received by the receiving part, the controller is configured to cause at least the part of the processing unit to move to the standby position and then to cause the printing part to move to the exchange position. With this, it is possible to prevent or suppress occurrence of such a situation that the cartridge is exchanged before at least the part of the processing unit is moved to the standby position. Accordingly, in the case that the cartridge is being exchanged, it is possible to suppress the occurrence of such a situation that the user makes contact with the processing unit or to suppress the occurrence of such a situation that the cartridge and the processing unit make contact with each other.

What is claimed is:

1. A printing apparatus comprising:

a printing part including an installment part in which a cartridge usable for printing an image is installable, the printing part being configured to print the image on a print medium and configured to move to an exchange position in a scanning direction; and a processing unit including a processing part configured to move while making contact with the print medium, which has the image printed thereon by the printing part, to thereby perform processing on the print medium, at least a part of the processing unit being positioned at a standby position which is shifted in the scanning direction with respect to the exchange position in a case that the cartridge is installed or detached with respect to the printing part, wherein the processing part is configured to divide the print medium, and in a case that the processing unit is seen from a direction along an up-down direction which is a direction crossing a front-rear direction as a conveyance direction of the print medium and the scanning direction, at least the part of the processing unit overlaps with the printing part.

2. The printing apparatus according to claim 1, further comprising a casing configured to accommodate the printing part and the processing unit, an opening or a recessed part, via which the cartridge is inserted or detached, being formed in the casing, wherein in a case that the printing part is located at the exchange position, a position in the scanning direction of at least a part of the opening or the recessed part is coincident with a position in the scanning direction of the printing part.

3. The printing apparatus according to claim 2, further comprising a shielding part configured to shield the processing unit, wherein the shielding part is configured to shield at least the part of the processing unit from an outside of the casing.

4. The printing apparatus according to claim 2, wherein the opening or the recessed part is located downstream of the installment part in the conveyance direction of the print medium, or above the installment part in the up-down direction which is the direction crossing the conveyance direction and the scanning direction.

5. The printing apparatus according to claim 1, further comprising:

a receiving part configured to receive an instruction input by a user; and a controller, wherein in a case that an instruction input is received by the receiving part, the controller is configured to cause the printing part to move to the exchange position.

6. The printing apparatus according to claim 5, wherein in a case that the instruction input is received by the receiving part, the controller is configured to cause at least the part of the processing unit to move to the standby position.

7. The printing apparatus according to claim 6, wherein in a case that the instruction input is received by the receiving part, the controller is configured to cause at least the part of the processing unit to move to the standby position and then to cause the printing part to move to the exchange position.

8. The printing apparatus according to claim 1, wherein in a case that the processing unit is seen from the direction along the up-down direction, an entirety of the processing unit overlaps with the printing part.

9. The printing apparatus according to claim 1, wherein the processing unit includes:

a first blade fixed to a casing that is configured to accommodate the printing part and the processing unit; and a movable part configured to move in the scanning direction and including a second blade, and in a case that the first blade is seen from the direction along the up-down direction, the first blade overlaps with the printing part.

10. The printing apparatus according to claim 1, wherein the processing unit includes a movable part configured to move in the scanning direction and including a blade, and a rail configured to cause the movable part to scan, and in a case that the rail is seen from the direction along the up-down direction, the rail overlaps with the printing part.

11. The printing apparatus according to claim 1, further comprising a conveyance route in which the print medium is conveyed, wherein the standby position is located, in the scanning direction, outside an area in which the printing medium passes through the conveyance route.

12. The printing apparatus according to claim 1, wherein the processing part is configured to divide the print medium along a line extending in the scanning direction.

13. The printing apparatus according to claim 1, wherein the processing part includes at least one blade.

14. The printing apparatus according to claim 13, wherein the at least one blade includes a pair of upper and lower blades.

15. The printing apparatus according to claim 1, wherein the processing part i configured to perform at least one of (a) cutting the print medium; (b) imparting a creasing to the print medium; or (c) imparting a perforation to the print medium.

16. A printing apparatus comprising:

a printing part including an installment part in which a cartridge usable for printing an image is installable, the printing part being configured to print the image on a print medium and configured to move to an exchange position in a scanning direction; and a processing unit including a processing part configured to move while making contact with the print medium, which has the image printed thereon by the printing part, to thereby perform processing on the print medium, at least a part of the processing unit being positioned at a standby position which is shifted in the scanning direction with respect to the exchange position in a case that the cartridge is installed or detached with respect to the printing part, wherein in a case that the processing unit is seen from a direction along an up-down direction which is a direction crossing a front-rear direction as a conveyance direction of the print medium and the scanning direction, at least the part of the processing unit overlaps with the printing part.

* * * * *